United States Patent
Stringham et al.

(10) Patent No.: US 11,756,001 B2
(45) Date of Patent: Sep. 12, 2023

(54) ONLINE COLLABORATION PLATFORM

(71) Applicant: Lucid Software, Inc., South Jordan, UT (US)

(72) Inventors: Ryan J. Stringham, Herriman, UT (US); Jarom Yan-Ming Chung, South Jordan, UT (US); Taylor Jessica Halversen, Murray, UT (US); Karl Steven Baranov, Salt Lake City, UT (US); Lindsey Whitefield Martin, Salt Lake City, UT (US); Geoffrey Ryan Maddox, Cottonwood Heights, UT (US); Sean P. McKenna, Midvale, UT (US); PinEn Chen, Draper, UT (US); Vasu Nephi Chetty, Vineyard, UT (US); Joseph Stack, South Jordan, UT (US)

(73) Assignee: LUCID SOFTWARE, INC., South Jordan, UT (US)

( * ) Notice: Subject to any disclaimer, the term of this patent is extended or adjusted under 35 U.S.C. 154(b) by 0 days.

(21) Appl. No.: 17/650,515

(22) Filed: Feb. 9, 2022

(65) Prior Publication Data
US 2022/0270050 A1  Aug. 25, 2022

Related U.S. Application Data

(63) Continuation of application No. 17/494,805, filed on Oct. 5, 2021.

(60) Provisional application No. 63/091,848, filed on Oct. 14, 2020, provisional application No. 63/087,764, filed on Oct. 5, 2020.

(51) Int. Cl.
G06F 9/451 (2018.01)
G06Q 10/10 (2023.01)
G06F 3/04812 (2022.01)

(52) U.S. Cl.
CPC ....... G06Q 10/103 (2013.01); G06F 3/04812 (2013.01); G06F 9/451 (2018.02)

(58) Field of Classification Search
CPC .... G06Q 10/103; G06F 3/04812; G06F 9/451
See application file for complete search history.

(56) References Cited

U.S. PATENT DOCUMENTS

| | | |
|---|---|---|
| 2003/0179230 A1 | 9/2003 | Seidman |
| 2005/0278041 A1* | 12/2005 | Bortnik ............. A63F 13/12 700/91 |
| 2007/0299710 A1* | 12/2007 | Haveliwala ......... G06Q 10/10 705/7.19 |

(Continued)

OTHER PUBLICATIONS

International Search Report and Written Opinion issued in corresponding application No. PCT/US2021/053668, dated Jan. 27, 2021.

*Primary Examiner* — Andrey Belousov
(74) *Attorney, Agent, or Firm* — Maschoff Brennan

(57) ABSTRACT

An example method to facilitate online collaboration includes granting access to an editable collaboration space to multiple users. The method includes dividing the users into subgroups including at least a first subgroup and a second subgroup. The method includes assigning the subgroups to different virtual breakout rooms in the editable collaboration space, including assigning users in the first subgroup to a first virtual breakout room and assigning users in the second subgroup to a second virtual breakout room that is different than the first virtual breakout room.

26 Claims, 16 Drawing Sheets

(56) References Cited

U.S. PATENT DOCUMENTS

| | | |
|---|---|---|
| 2010/0192107 A1 | 7/2010 | Takahashi |
| 2010/0257457 A1 | 10/2010 | De Goes |
| 2014/0075330 A1 | 3/2014 | Kwon |
| 2016/0241609 A1* | 8/2016 | Xin ..................... G06F 21/6218 |
| 2020/0074005 A1 | 3/2020 | Hewitt et al. |

* cited by examiner

ONLINE COLLABORATION PLATFORM

CROSS-REFERENCE TO RELATED APPLICATIONS

This application is a continuation of U.S. application Ser. No. 17/494,805 filed Oct. 5, 2021, which claims the benefit of and priority to U.S. Provisional App. No. 63/087,764 filed Oct. 5, 2020 and U.S. Provisional App. No. 63/091,848 filed Oct. 14, 2020. Each of the foregoing applications is incorporated herein by reference in its entirety.

FIELD

The embodiments discussed herein are related to an online collaboration platform.

BACKGROUND

Unless otherwise indicated herein, the materials described herein are not prior art to the claims in the present application and are not admitted to be prior art by inclusion in this section.

Some online collaboration platforms are flexible, cloud-based environments that allow teams to communicate and collaborate in real time. Such platforms may provide an infinite scalable canvas and offer collaboration features like simultaneous editing, whiteboarding, diagramming, screen sharing, sticky notes, commenting, labeled cursors, text chat, and video and audio conferencing.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used a as an aid in determining the scope of the claimed subject matter.

In an example embodiment, a method to facilitate online collaboration includes granting access to an editable collaboration space to multiple users. The method includes dividing the users into subgroups including at least a first subgroup and a second subgroup. The method includes assigning the subgroups to different virtual breakout rooms in the editable collaboration space, including assigning users in the first subgroup to a first virtual breakout room and assigning users in the second subgroup to a second virtual breakout room that is different than the first virtual breakout room.

In another example embodiment, a method to facilitate online collaboration includes granting access to an editable collaboration space to multiple users. The method includes dividing the users into subgroups including at least a first subgroup and a second subgroup. The method includes assigning the subgroups to different virtual breakout rooms in the editable collaboration space, including assigning users in the first subgroup to a first virtual breakout room and assigning users in the second subgroup to a second virtual breakout room that is different than the first virtual breakout room. The method includes receiving input from at least one user in each of the subgroups that is effective to add content to a corresponding virtual breakout room. The method includes bringing content from each of the virtual breakout rooms to a virtual common room.

In another example embodiment, a method to cluster graphical objects in a collaboration space includes displaying graphical objects in a collaboration space, each of the graphical objects including text. The method includes receiving first input to select two or more of the graphical objects. The method includes receiving second input to cluster the selected graphical objects according to intent, theme, or commonalities of the text of the selected graphical objects. The method includes determining one or more intents, themes, or commonalities of the text of the selected graphical objects. The method includes, in response to the second input, clustering the selected graphical objects according to the one or more determined intents, themes, or commonalities of the text of the selected graphical objects.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

Figure 1:
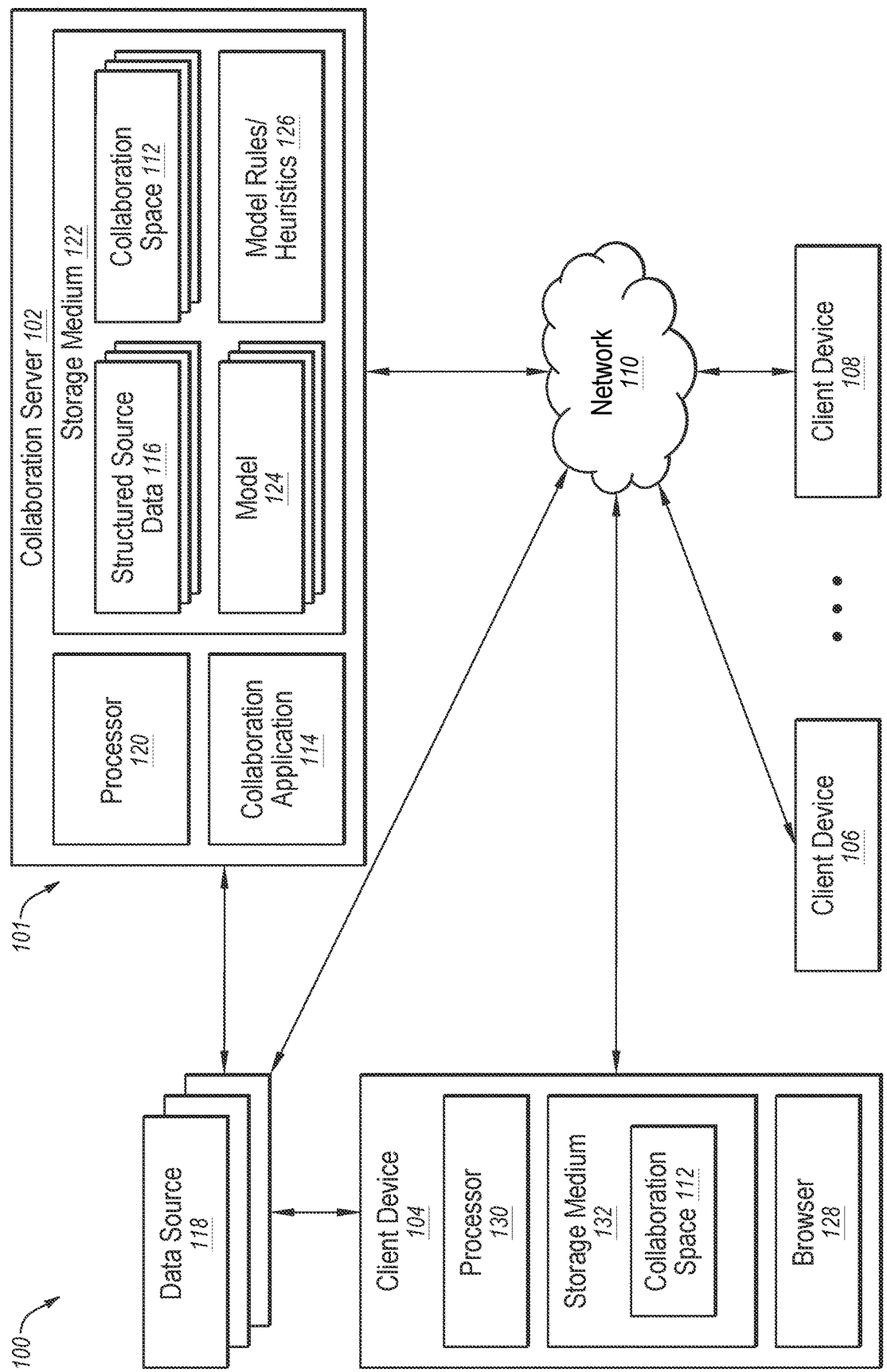
FIG. 1 is a block diagram of an example operating environment for an online collaboration platform.

FIG. 1 is a block diagram of an example operating environment 100 for an online collaboration platform 101, arranged in accordance with at least one embodiment described herein. The environment 100 includes a collaboration server (hereinafter "server") 102, one or more client devices 104, 106, 108, and a network 110.

In general, the network 110 may include one or more wide area networks (WANs) and/or local area networks (LANs) that enable the server 102 and the client devices 104, 106, 108, to communicate with each other. In some embodiments, the network 110 may include the Internet, including a global internetwork formed by logical and physical connections between multiple WANs and/or LANs. Alternately or additionally, the network 110 may include one or more cellular radio frequency (RF) networks and/or one or more wired and/or wireless networks such as 802.xx networks, Bluetooth access points, wireless access points, Internet Protocol (IP)-based networks, or other wired and/or wireless networks. The network 110 may also include servers that enable one type of network to interface with another type of network.

In some embodiments, the server 102 and/or the client devices 104, 106, 108 may be configured to allow users, e.g., users of the client devices 104, 106, 108, to communicate and collaborate online in real time. For example, the server 102 may generally host collaboration spaces or virtual whiteboards 112, each of which may be accessed by one or multiple users simultaneously or asynchronously via client devices 104, 106, 108. Within the collaboration spaces 112, users may generate graphical diagrams or visualizations with graphical objects or content authored by users via a collaboration application 114 hosted by the server 102. As an example, the collaboration application 114 may include a virtual whiteboard application such as LUCIDSPARK, MURAL, MIRO, CONCEPTBOARD, ZITEBOARD, MICROSOFT WHITEBOARD, or other virtual whiteboard application.

When multiple client devices 104, 106, 108 are simultaneously accessing the same collaboration space 112, the collaboration application 114 may show graphical objects or other content added, moved, or otherwise modified by a given user to other users. A collaboration space as used herein may refer to a document or other file that includes graphical objects generated, formatted, and/or grouped by users on a graphical drawing canvas. Alternatively or additionally, a collaboration space may include data collections and/or pointers to data collections used to generate, format, or group graphical objects.

Graphical objects generated within the collaboration spaces 112 may be simple graphical objects or data-backed graphical objects. Simple graphical objects may be stored within collaboration spaces 112 with various graphical attributes, such as shape, size, outline color, fill color, or other graphical attributes. Data-backed graphical objects may be explicitly stored as and/or represented by data collections in structured source data 116. Each data-backed graphical object may have a corresponding data collection in a set of structured source data 116 that explicitly identifies attributes of the graphical object, such as graphical attributes (e.g., fill color, outline color, shape) as well as other attributes such as an author of the graphical object, a tag applied to the graphical object, a number of votes from users, reactions from users, an author of each reaction (hereinafter "reactor"), text of or in the graphical object, or other attribute(s).

Users may generate container graphical objects (hereinafter "containers") within the collaboration spaces 112, e.g., to organize other graphical objects. Containers may be simple containers or data-backed containers. Containers may organize or group simple or data-backed graphical objects based on some attribute of the graphical objects. For example, within a single data-backed container, graphical objects may be organized in columns or tabs based on an attribute of the graphical objects. As another example, graphical objects may be grouped into different simple or data-backed containers based on an attribute of the graphical objects. In these and other embodiments, when the attribute of one of the graphical objects is changed, the graphical object may be automatically moved from one column or tab to another within the data-backed container or may be removed from the container and potentially placed in a different container based on the changed attributed.

Simple containers may have no responsiveness or less responsiveness to attribute changes of graphical objects than data-backed containers. In some embodiments, a given simple container may be unable to organize graphical objects within the simple container in columns or tabs. However, when graphical objects are grouped into different simple containers based on an attribute and the attribute of a given graphical object is changed, the graphical object may be automatically moved from one corresponding simple container to another.

Simple containers and data-backed containers may behave similarly or differently. For example, data-backed containers may automatically resize to accommodate the addition or removal of a graphical object, whereas simple containers may not, e.g., simple containers may require manual resizing. Alternatively or additionally, a graphical object may be automatically removed from or added to a simple or data-backed container when a corresponding change to a corresponding attribute of the graphical object is made. Alternatively or additionally, a graphical object may be automatically removed from or added to a column or tab within a data-backed container when a corresponding change to a corresponding attribute of the graphical object is made.

In some embodiments, graphical objects may be converted from simple graphical objects to data-backed graphical objects, e.g., by a user manually dragging a simple graphical object into a data-backed container. In this example, the user input (e.g., of dragging the simple graphical object into the data-backed container) may be effective to cause a data collection for the graphical object to be generated and added to the structured source data 116 for the collaboration space 112 such that the simple graphical object is converted to a data-backed graphical object. Alternatively or additionally, graphical objects may be converted from data-backed graphical objects to simple graphical objects, e.g., by a user manually dragging a data-backed graphical object out of a data-backed container into a simple container or into an area of the collaboration space 112 that is free of data-backed containers. In this example, the user input (e.g., of dragging the data-backed graphical object out of the data-backed container) may be effective to cause a data collection for the graphical object to be deleted from the structured source data 116 for the collaboration space 112 such that the data-backed graphical object is converted to a simple graphical object.

Collaboration spaces 112 generated by the collaboration application 114 may be exported to other systems or applications. In some embodiments, a collaboration space 112 may be exported along with its corresponding structured source data to another application.

In some embodiments, the collaboration application 114 may generate graphical diagrams or visualizations within the collaboration spaces 112 from structured source data of one or more data sources 118. In this and other examples, some of the sets of structured source data 116 may represent or be derived from corresponding ones of the data sources 118. Additional details regarding graphical diagrams or visualizations generated based on structured source data are disclosed in the following U.S. patent documents which are incorporated herein by reference in their entireties: U.S. Pat. Nos. 10,860,602, 10,860,603, U.S. Patent Pub. No. 20200004872 (U.S. application Ser. No. 16/024,551, filed Jun. 29, 2018), and U.S. Pat. No. 11,144,516.

Although one server 102 and three client devices 104, 106, 108 are illustrated in FIG. 1, the environment 100 may more generally include one or more servers 102 and one or more client devices 104, 106, 108. In these and other embodiments, the environment 100 may include other servers and/or devices not illustrated in FIG. 1.

In general, the server 102 may host the collaboration application 114 that allows the client devices 104, 106, 108 to collaborate online, including reflecting changes made to a collaboration space 112 at one of the client devices 104, 106, 108 to the others of the client devices 104, 106, 108. Alternatively or additionally, the collaboration application 114 may facilitate offline collaboration and/or may implement one or more aspects of U.S. Pat. No. 9,087,113 which is incorporated herein by reference in its entirety.

In some embodiments, the collaboration application 114 may identify an author (e.g., user) of one or more graphical objects and one or more mouse cursors/pointers such that users can identify visually the content and activity of a given user when in a collaboration space 112. In this and other embodiments, each user may have an assigned color and/or other visual attribute and the collaboration application 114 may display the mouse cursor/pointer and all graphical objects (e.g., sticky notes, freehand objects, shapes, text boxes, etc.) generated by each user with the corresponding visual attribute(s). For example, a mouser cursor/pointer and all graphical objects generated by user A may be displayed in the collaboration space 112 with a first color (e.g., red), a mouse cursor/pointer and all graphical objects generated by user B may be displayed in the collaboration space 112 with a second color (e.g., blue), and so on. Instead of or in addition to color, other visual attributes such as fill pattern, transparency, or others may be used to identify the author of each graphical object and mouse cursor/pointer.

An operating mode of the server 102 in which the users or other authors of graphical objects and/or mouse cursors/pointers in a collaboration space 114 are identified by color and/or other visual attribute may be referred to herein as an author ID mode. In some embodiments, the author ID mode may be enabled in response to user input. For instance, a user of any of the client devices 104, 106, 108 accessing a given collaboration space 112 may navigate a menu within the collaboration space 112 and make an appropriate menu selection to enable (or disable) the author ID mode.

In some embodiments, each user may manually set or select a desired color and/or other visual attribute as the user's identifier. In some embodiments, one user or a subset of all users in the collaboration space 112 may manually assign a different color or other visual attribute to all the users in the collaboration space 112. Alternatively or additionally, the server 102 may assign a different color and/or other visual attribute to each of the users in a given collaboration space 112. Alternatively or additionally, the collaboration application 114 may generate a legend in the collaboration space 112 that shows the color/attribute-user assignments.

The server 102 may additionally include a processor 120 and a storage medium 122. The processor 120 may be of any type such as a central processing unit (CPU), a microprocessor (µP), a microcontroller (µC), a digital signal processor (DSP), or any combination thereof. The processor 120 may be configured to execute computer instructions that, when executed, cause the processor 120 to perform or control performance of one or more of the operations described herein with respect to the server 102.

The storage medium 122 may include any non-transitory computer-readable medium, including volatile memory such as random access memory (RAM), persistent or non-volatile storage such as read only memory (ROM), electrically erasable and programmable ROM (EEPROM), compact disc-ROM (CD-ROM) or other optical disk storage, magnetic disk storage or other magnetic storage device, NAND flash memory or other solid state storage device, or other persistent or non-volatile computer storage medium. The storage medium 122 may store computer instructions that may be executed by the processor 120 to perform or control performance of one or more of the operations described herein with respect to the server 102.

The storage medium 122 may additionally store the sets of structured source data 116, collaboration spaces 112, one or more models 124, and/or model rules and/or heuristics 126 ("Model Rules/Heuristics" in FIG. 1). Each set of structured source data 120 may be generated for the data-backed graphical objects and containers in a given collaboration space 112 and/or may be imported from a corresponding one of the data sources 118. The structured source data 120 may be imported over the network 110 or directly from the corresponding data source 118 if a direct connection exists.

The model rules and/or heuristics 126 include rules and/or heuristics that may be applied to the structured source data 116 to derive information about nodes and/or their relationships represented in the structured source data 116. The structured source data 116 and/or the information derived by the model rules and/or heuristics 126 may be used by the server 102 to generate the models 124, each model 124 corresponding to a different set of structured source data 116. Graphical diagrams within the collaboration spaces 112 may be generated directly from a corresponding set of the structured source data 116 and/or from a corresponding one of the models 124 derived from the corresponding set of structured source data 116.

Each of the client devices 104, 106, 108 may execute an application, such as a browser 128, configured to communicate through the network 110 with the server 102. The browser 128 may include an Internet browser or other suitable application to communicate through the network 110 with the server 102. The browser 128 may generate, download and/or interact with collaboration spaces 112, structured source data 116, and/or graphical diagrams within the collaboration spaces 112. Each of the client devices 104, 106, 108 may include a desktop computer, a laptop computer, a tablet computer, a mobile phone, a smartphone, a personal digital assistant (PDA), a wearable device (e.g., a smart watch), an interactive whiteboard (e.g., SURFACE HUB) or another suitable client device.

Each of the client devices 104, 106, 108 may additionally include a processor and a storage medium, such as a processor 130 and a storage medium 132 as illustrated for the client device 104 in FIG. 1. Each of the other client devices 106, 108 may be similarly configured. Similar to the processor 120 of the server 102, the processor 130 may be of any type such as a CPU, a µP, a µC, a DSP, or any combination thereof. The processor 130 may be configured to execute computer instructions that, when executed, cause the processor 130 to perform or control performance of one or more of the operations described herein with respect to the client device 104 and/or the browser 128.

Similar to the storage medium 122 of the server 102, the storage medium 132 of the client device 104 may include any non-transitory computer-readable medium, including volatile memory such as RAM, persistent or non-volatile storage such as ROM, EEPROM, CD-ROM or other optical disk storage, magnetic disk storage or other magnetic storage device, NAND flash memory or other solid state storage device, or other persistent or non-volatile computer storage medium. The storage medium 132 may store computer instructions that may be executed by the processor 130 to perform one or more of the operations described herein with respect to the client device 104 and/or the browser 128. The storage medium 132 may additionally store, at least temporarily, a collaboration space 112, some of a corresponding set of structured source data 116 or model 124, and/or other content obtained from the server 102 and/or generated locally on the client device 104.

Embodiments described herein are not limited to using a browser to communicate with the server 102 to collaborate online with other users. For example, rather than or in addition to a browser, the client devices 104, 106, 108 may include a native app as are often used on client devices such as mobile devices including smartphones, tablet computers, and interactive whiteboards. Accordingly, embodiments described herein generally include collaborating online using a browser, a native app, or another suitable application on the client devices 104, 106, 108.

Figure 2:
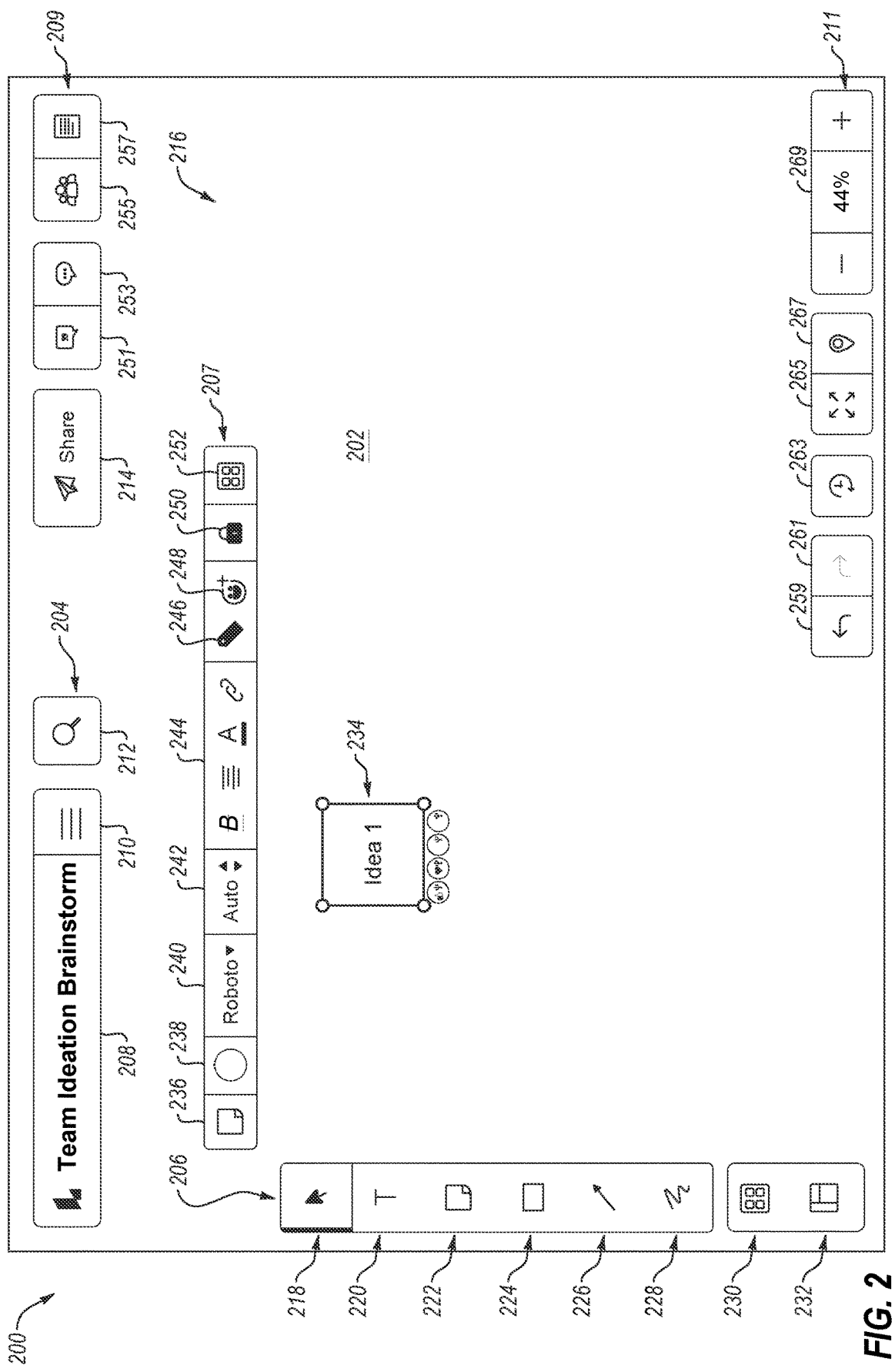
FIG. 2 includes a graphical representation of an example user interface (UI) for online collaboration.

FIG. 2 includes a graphical representation 200 of an example UI for online collaboration, arranged in accordance with at least one embodiment described herein. The UI may be provided by the browser 128 and/or the collaboration application 114 of FIG. 1. For instance, the browser 128 in cooperation with the collaboration application 114 may present the UI of FIG. 2 to a user through and/or on a display of the client device 104.

In FIG. 2, the graphical representation 200 includes a graphical drawing canvas 202 (hereinafter "canvas 202") and various menu bars 204, 206, 209, 211. Each of the menu bars 204, 206, 209, 211 may be fixed or movable within or around the canvas 202. Alternatively or additionally, the UI may present one or more contextual formatting bars when a given graphical object has been selected or is being edited. An example contextual formatting menu bar 207 for a sticky note is described below. More generally, embodiments described herein include graphical drawing canvases with one or more menu bars (or other menu arrangements) that are fixed or movable within or around the graphical drawing canvases, where the one or more menu bars (or other menu arrangement) include one or more of the menu options described with respect to the menu bars 204, 206, 209, 211, 207 or other menu bars.

The menu bar 204 includes a collaboration space filename field 208 (hereinafter "field 208"), an additional options button 210, and a search field 212. The field 208 may display a filename of a collaboration space 216 currently displayed in the canvas 202. Alternatively or additionally, a user may place their mouse cursor/pointer in the field 208 and begin typing or navigate a file system to open a different collaboration space.

The additional options button 210 may be selected by the user to access additional options, such as file export (e.g., export the collaboration space 216 as one of various file types (e.g., pdf, png, svg, other LUCID software products, or the like)), file import (e.g., import a non-collaboration space file, e.g., from other LUCID software products, as a collaboration space), print, canvas options (snap to objects, show grid), and keyboard shortcuts.

Within the search field 212, the user may enter text to search the collaboration space 216 for matching text.

The menu bar 206 may generally include options to generate new graphical objects. As illustrated, the menu bar 206 includes a cursor button 218, a text box button 220, a sticky note button 222, a shape button 224, a connector button 226, a freehand button 228, a container and organize ideas button 230, and a template button 232.

The cursor button 218 may be selected by the user to select objects or activate other buttons.

The text box button 220 may be selected by the user to generate a text box.

The sticky note button 222 may be selected by the user to generate a sticky note, such as a sticky note 234. For example, selection of the sticky note button 222 may present a popup menu to the user that includes one or more of selectable sticky note colors, a quick sticky note field, or an upload option.

If one of the colors is selected from the popup menu, the user may move the cursor to a desired location and left click or provide other suitable input to draw a sticky note with the selected color at the desired location. Each sticky note may have a text field that the user may fill in when the sticky note is generated in this manner.

Entering text via the quick sticky note field in the popup menu may generate and automatically place sticky notes in the canvas 202 in response to keyboard (or other) input from the user without requiring manual placement of the sticky notes by the user in the canvas 202. In an example of the quick sticky note mode, the user may input text in the quick sticky note field and enter a hard return to generate a sticky note with the text, the sticky note being automatically placed in an area of the canvas 202 that does not cover the quick sticky note field in the popup menu. The user may continue inputting text in the quick sticky note field and entering hard returns to generate and automatically place additional sticky notes in the canvas, e.g., via keyboard input only.

In some embodiments, the user may paste a list of text in the canvas 202 to automatically generate sticky notes with the text.

If the upload option is selected from the popup menu, the user may upload a csv or txt file to generate sticky notes that include the contents of the csv or txt file.

Figure 4A:
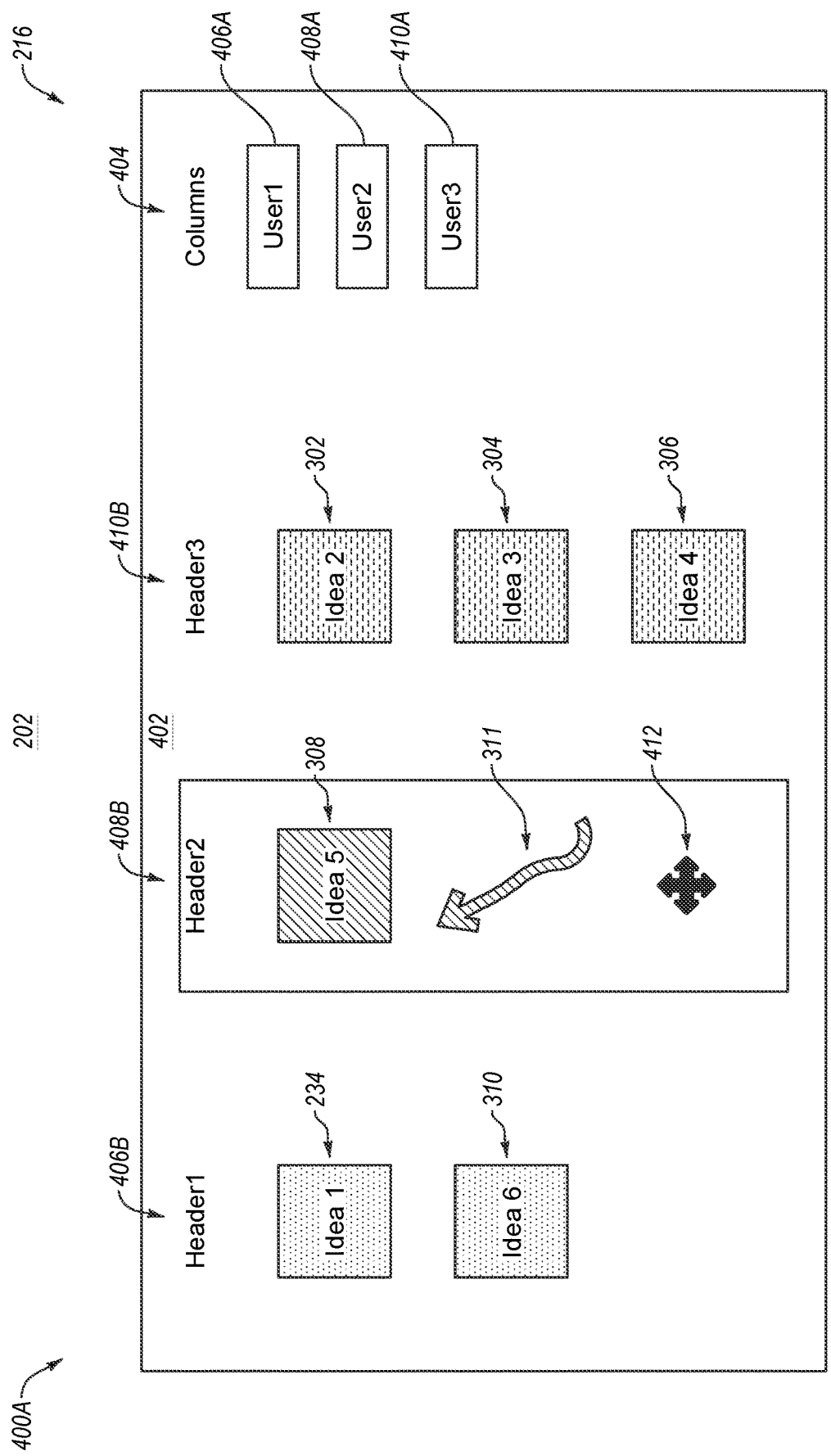
FIG. 4A includes a graphical representation of an example data-backed container that may be implemented in the UI of FIG. 2.

The shape button 224 may be selected by the user to generate graphical objects with predefined shapes or types, e.g., rectangle, diamond, circle, ellipse, bracket, etc., that may be presented to the user in a popup menu in response to selection of the shape button 224. In an example, when the popup menu is presented, the user may select an icon of the desired shape from the popup menu and may then move the cursor to a desired location and left click or provide other suitable input at the desired location to generate a graphical object with the desired shape at the desired location. An example data-backed container is illustrated in FIG. 4A. Sticky notes or other graphical objects placed in the data-backed container may be associated with or belong to the data-backed container.

The connector button 226 may be selected by the user to generate a connector. In some implementations, after selection of the connector button 226, a first left click of the user's mouse (or other suitable input) may mark a start point of the connector and a second left click of the user's mouse (or other suitable input) may mark an endpoint of the connector with the connector generally being displayed as extending from the start point to the endpoint.

The freehand button 228 may be selected by the user to draw a freehand graphical object.

The container and organize ideas button 230 may be selected by the user to sort, gather, or cluster graphical objects into one or more containers based on one or more attributes of the graphical objects. For instance, a popup menu may be presented to the user in response to selection of the container and organize ideas button 230 and the popup menu may include options to sort, gather, or cluster on all graphical objects within the collaboration space 216. Alternatively or additionally, the popup menu may include options to sort graphical objects within a single data-backed container into columns, rows, or tabs.

As used herein, sorting graphical objects based on an attribute may include generating a different container for each distinct value of the attribute for all graphical objects in the canvas 202 and moving each graphical object into the corresponding container. For instance, sorting graphical objects by color may include generating a different container for each distinct color of graphical objects in the canvas 202 (e.g., one container for red, one container for yellow, etc.) and moving all graphical objects with the given color into the corresponding container. Thus, if there are X red graphical objects, Y green graphical objects, and Z blue graphical objects and the sort option is selected from the popup menu, the collaboration application 114 may generate a first container for red graphical objects, a second container for green graphical objects, and a third container for blue graphical objects. The collaboration application 114 may then move all X red graphical objects into the first container, all Y green graphical objects into the second container, and all Z blue graphical objects into the third container. In this example, X, Y, and Z represent positive integers.

As used herein, gathering graphical objects based on one or more attributes may include generating a container and moving all graphical objects that have a corresponding specified value for each of one or more specified attributes into the container. For instance, gathering graphical objects that have a color A and a keyword B may include generating a container and moving graphical objects of the color A and that have the keyword B into the container. The gathering operation may be performed on all graphical objects in the collaboration space 216 or canvas 202. Alternatively, the gathering operation may be performed on a set of graphical objects in the collaboration space 216 or canvas 202 that have been selected by a user without being applied to un-selected graphical objects in the collaboration space 216 or canvas 202. Alternatively, the collaboration space 216 or canvas 202 may be divided into predefined areas or regions (e.g., each assigned to a different one of multiple teams or users all working in the collaboration space 216 in a corresponding assigned area or region) and the gathering operation may be performed on the graphical objects within the particular predefined area or region in which the user is working without being applied to other graphical objects in other predefined areas or regions.

The attribute(s) used to sort or gather graphical objects may include one or more of author, shape, color, reaction, reactor, vote, tag, keyword, intent, theme, or other attribute.

The template button 232 may be selected by the user to add a predefined collection of shapes, containers, or data-backed containers to the canvas. For instance, selection of the template button 232 may present a popup menu to the user that includes various templates the user can select to have the canvas 202 populated with the predefined collection.

The contextual formatting menu bar 207 may be displayed when a graphical object is generated and/or while it is selected, e.g., for editing and may disappear when no graphical object is selected. In this example, the sticky note 234 has just been generated and/or selected for editing. The contextual formatting menu bar 207 may include one or more of a change shape type button 236, a fill color button 238, an outline color button (not shown in FIG. 2), a text font button 240, a font size button 242, various text formatting buttons 244, a tagging button 246, a reaction button 248, a lock button 250, and a container and organize ideas button 252.

The change shape button 236 may be selected by the user to change a shape or type of the selected graphical object. For instance, selection of the change shape button 236 may present a popup menu to the user from which the user may select any of multiple available graphical object shapes or types, such as sticky note, rectangle, diamond, circle, ellipse, bracket, etc. Selection of a shape or type from the popup menu may then change the current shape or type of the selected graphical object to the selected shape or type.

The fill color button 238 may be selected to set a fill color of the selected graphical object. For instance, selection of the fill color button 238 may present a popup menu to the user from which the user may select any of multiple colors. Selection of a color from the popup menu may then change the current color of the selected graphical object to the selected color.

The text font button 240 may be selected to set a text font of the selected graphical object.

The font size button 242 may be selected to change the font size of text included in the selected graphical object.

Each of the text formatting buttons 244 may be selected to set a corresponding one of various text attributes of the text within the selected graphical object, such as bold, italics, underline, strikethrough, or alignment and/or to insert hyperlinks in the text.

The tagging button 246 may be selected to apply a tag to the selected graphical object. Tags may be used for organizing or grouping sticky notes or other graphical objects as described elsewhere herein.

The reaction button 248 may be selected to react to the selected graphical object. For example, user A may react to a sticky note or other graphical object created by user B by selecting the sticky note created by user B, selecting the reaction button 248, and selecting a desired reaction from multiple reactions that may popup when the reaction button 248 is selected. The reactions may include emojis, up/down votes, or other reactions.

The lock button 250 may be selected to lock the position, size, text, or other attribute(s) of the selected graphical object.

The container and organize ideas button 252 may be the same as or similar to the container and organize ideas button 230 in the menu bar 206. In some embodiments, when one or more graphical objects have been selected and the container and organize ideas button 252 is selected, the user may be presented with one or more of the following options, e.g., in a popup menu: create container, selection-specific sort, selection-specific gather, or selection-specific cluster. The create container option may generate a new container that includes all of the selected graphical objects. The selection-specific sort may perform a sort (as described above) on the selected graphical objects but not on unselected graphical objects. The selection-specific gather may perform a gather on the selected graphical objects but not on unselected graphical objects. The selection-specific cluster may cluster the selected graphical objects based on themes/commonalities of text included in selected graphical objects.

The particular options or buttons included in the contextual formatting menu bar 207 may vary depending on the selected graphical object. For example, the fill color button 238 and text formatting buttons 244 may be included in the contextual formatting menu bar 207 when the selected graphical object is a sticky note or other graphical object that has a fill color and text, but may be omitted from the contextual formatting menu bar 207 when the selected graphical object is a connector or other graphical object that lacks a fill color and text. The contextual formatting menu bar 207 may disappear when no graphical object is selected.

The menu bar 209 may include one or more of a share button 214, a comment button 251, a chat button 253, a team tools button 255, and a notes button 257.

The share button 214 may be selected to share the collaboration space 216 with one or more other users. For example, selection of the share button 214 may open a popup menu that includes one or more fields to enter email addresses or other contact information of users to share the collaboration space 216 with.

The comment button 251 may be selected to add comments to the collaboration pace 216 or individual graphical objects within the collaboration space 216. For example, selection of the comment button 251 may open a popup menu that includes a field to enter a comment. If no graphical object has been selected and the comment is entered, the comment may be associated with the collaboration space 216 as a whole. If a graphical object has been selected when the comment is entered, the comment may be associated with the selected graphical object. In some embodiments, a comment icon or other icon or visual cue may be included in the canvas 202 on or near graphical objects that have one or more comments to indicate the existence of the comments.

The chat button 253 may be selected to open a chat window with one or more other users. For example, selection of the chat button 253 may open the chat window that may include one or more fields to enter email addresses or other contact information of users to chat with.

The team tools button 255 may be selected to access one or more team tools. The team tools may include, for example, a timer, voting, and color (or other visual attribute) assignments. For example, selection of the team tools button 255 may open a popup menu that includes the various team tools, selection of which may open a corresponding popup menu to set a timer, create a voting session, or make color (or other visual attribute) assignments to users. Setting a timer may help keep participating users engaged and focused. A voting session may allow voting to be used to capture the users' thoughts and opinions. The assignment of colors or other visual attributes to users (or authors) is discussed elsewhere herein (e.g., in connection with FIG. 3).

The notes button 257 may be selected to create notes. For example, selection of the notes button 257 may open a notes bar in which the user may add notes. The notes in the notes bar may be kept private for the user.

The menu bar 211 may include one or more of an undo button 259 a redo button 261, a revision history button 263, a full-screen button 265, a minimap button 267, and zoom buttons/field (hereinafter "zoom") 269.

The undo button 259 may be selected by the user to undo an immediately preceding operation of the user in the collaboration space 216. Selection of the undo button 259 N times in series may undo the preceding N operations of the user in the collaborations pace 216 where N is a number that is less than or equal to a maximum number of user operations stored in memory of the collaboration application 114 or locally at the client device 104.

The redo button 261 may be selected by the user to redo an immediately preceding operation of the user in the collaboration space 216. Selection of the redo button 261 N times in series may redo the immediately preceding operation N times.

The revision history button 263 may be selected by the user to access a popup window that includes a list of revisions of the collaboration space 216. Selection of a given one of the revisions from the list may revert the collaboration space 216 to the selected revision. Each revision may include a point-in-time version of the collaboration space 216 taken periodically, randomly, after every user operation, after every series of two or more user operations, or at some other interval or according to some other schedule.

The full-screen button 265 may be selected to change to full-screen view. When in the full-screen view, the full-screen button 265 may be replaced by a reduce screen button that may be selected to exit the full-screen view.

The zoom 269 may include a zoom-in button ("−" in FIG. 2) to zoom in on the collaboration space 216, a zoom-out button ("+" in FIG. 2) to zoom out on the collaboration space, and a zoom level field (illustrates as "44%" in FIG. 2) that may indicate the current zoom level and/or within which the user may type a value of a desired zoom level to change the zoom to the desired zoom level without using the zoom-in or zoom-out buttons.

Figure 3:
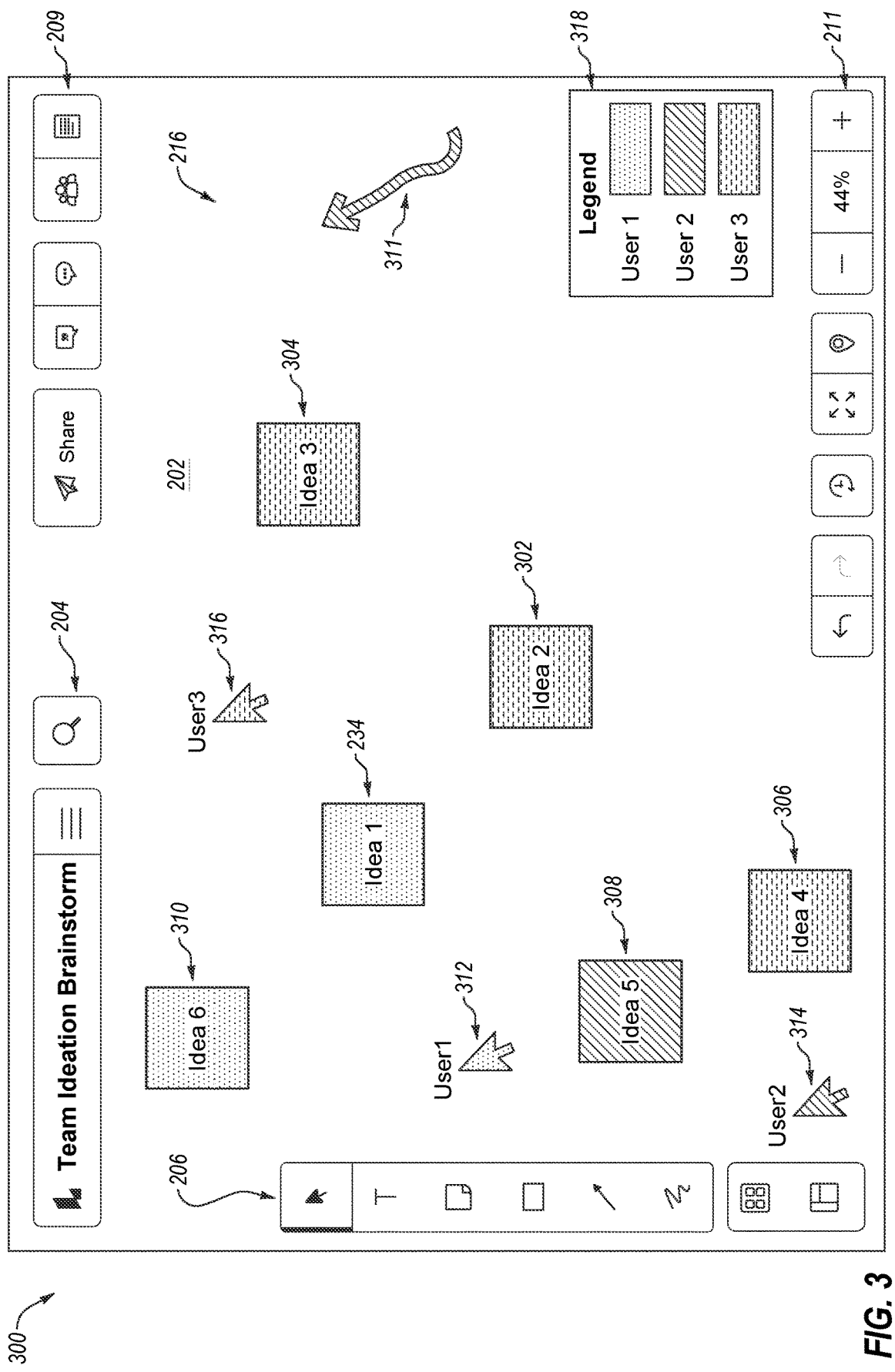
FIG. 3 includes a graphical representation of the UI of FIG. 2 operating in an author ID mode.

FIG. 3 includes a graphical representation 300 of the UI of FIG. 2 operating in an author ID mode, arranged in accordance with at least one embodiment described herein. The graphical representation 300 includes the menu bars 204, 206, 209, 211 and the sticky note 234 of FIG. 2. The graphical representation additionally includes sticky notes 302, 304, 306, 308, 310 and a freehand graphical object 311.

In the author ID mode, as previously described, the collaboration application 114 (FIG. 1) may identify the author of each graphical object and mouse cursor/pointer so that all users can identify visually the content and activity of a given user when in a collaboration space, such as the collaboration space 216. Thus, as illustrated in FIG. 3, the content and mouse cursors/pointers of each of three different users, referred to as User1, User2, and User3, are identified as belonging to the corresponding user by one or more corresponding visual attributes of the content and mouse cursors/pointers. The visual attribute used to identify authors in this example is fill pattern.

In more detail, a mouser cursor/pointer 312 of User1 and each of the sticky notes 234 and 310 created by User1 have a same dot fill pattern. A mouser cursor/pointer 314 of User2, the sticky note 308 created by User2, and the freehand graphical object 311 created by User2 have a same line fill pattern. A mouser cursor/pointer 316 of User3 and each of the sticky notes 302, 304, and 306 created by User3 have a same brick fill pattern.

Alternatively or additionally, a name of each user may appear near each of the mouse cursors/pointers 312, 314, 316 to further identify each mouse cursor/pointer 312, 314, 316. In this example, the name "User1" appears immediately above the mouse cursor/pointer 312 of User1, the name "User2" appears immediately above the mouse cursor/pointer 314 of User2, and the name "User3" appears immediately above the mouse cursor/pointer 316 of User3.

In some embodiments, the collaboration application 114 (FIG. 1) may additionally generate and display in the collaboration space 216 to each of the users a legend 318. The legend 318 may identify the particular visual attribute (e.g., fill pattern in this example) assigned to each user. The visual attribute assignments may be set manually by some or each of the users. For example, users may set or change their assigned visual attribute in a panel or menu of the UI (e.g., using the color (or other visual attribute) assignment tool of the team tools button 255) or in the legend 318, e.g., by selecting the user or visual attribute assignment within the legend 318. Alternatively or additionally, the visual attribute assignments may be set automatically by the collaboration application 114 (FIG. 1).

FIG. 4A includes a graphical representation 400A of an example data-backed container 402 (hereinafter "container 402") that may be implemented in the UI of FIG. 2, arranged in accordance with at least one embodiment described herein. In particular, the container 402 is illustrated as part of the collaboration space 216 in the canvas 202 of FIG. 2. The menu bars 204, 206, 207, 209, 211 have been omitted from FIG. 4A for simplicity. The container 402 includes each of the sticky notes 234, 302, 304, 306, 308, 310 and the freehand graphical object 311.

With all of the sticky notes 234, 302, 304, 306, 308, 310 and the freehand graphical object 311 belonging to or otherwise associated with the container 402, the sticky notes 234, 302, 304, 306, 308, 310 and the freehand graphical object may be automatically organized in columns, rows, or tabs responsive to user input. For example, a contextual formatting menu bar that is displayed in the collaboration space 216 when a data-backed container is selected may include a button or other menu option to organize graphical objects in the data-backed container in columns, rows, or tabs based on an attribute of the graphical objects that may be selected from the menu.

Alternatively or additionally, the container 402 may display an attribute legend 404 responsive to selection of the menu option to organize graphical objects in the data-backed container in columns (or rows or tabs) based on a selected attribute. The attribute legend 404 may include an attribute value field 406A, 408A, 410A for each corresponding column (or row or tab) 406B, 408B, 410B of the container 402. Each attribute value field 406A, 408A, 410A may include a value of the selected attribute for each of the graphical objects in the corresponding column (or row or tab). In this example, the attribute selected to organize the graphical objects within the container 402 is author and the attribute legend 404 shows attribute values of User1, User2, and User3 as the value of the author attribute for graphical objects in each of, respectively, columns 406B, 408B, and 410B. Thus, the column 406B includes the sticky notes 234, 310 authored by User1, the column 408B includes the sticky note 308 and the freehand graphical object 311 authored by User2, and the column 410B includes the sticky notes 302, 304, 306 authored by User3. More generally, the attribute used to organize graphical objects into columns, rows, or tabs of a data-backed container may include author, color, reaction, reactor, votes, tags, keyword, or other attribute(s).

In some embodiments, columns, rows, or tabs within a data-backed container may be moved to different locations, e.g., to different columns, rows, or tabs within the data-backed container. For example, selection of a column, such as the column 408B, by mouse click or other input may highlight the column 408B (or provide other visual cue indicative of selection) and cause a drag and drop icon 412 to appear. The highlighted column may then be moved to another location by, e.g., dragging and dropping the drag and drop icon 412 of the column 408B to another location.

When a column, row, or tab within a data-backed container is moved around within the data-backed container, the collaboration application 114 (FIG. 1) may highlight a next location in a direction the column, row, or tab is being moved. When a desired location for the column, row, or tab is highlighted, the user may "drop" the column, row, or tab to have it moved to the desired location. An example is illustrated in FIG. 4B.

Figure 4B:
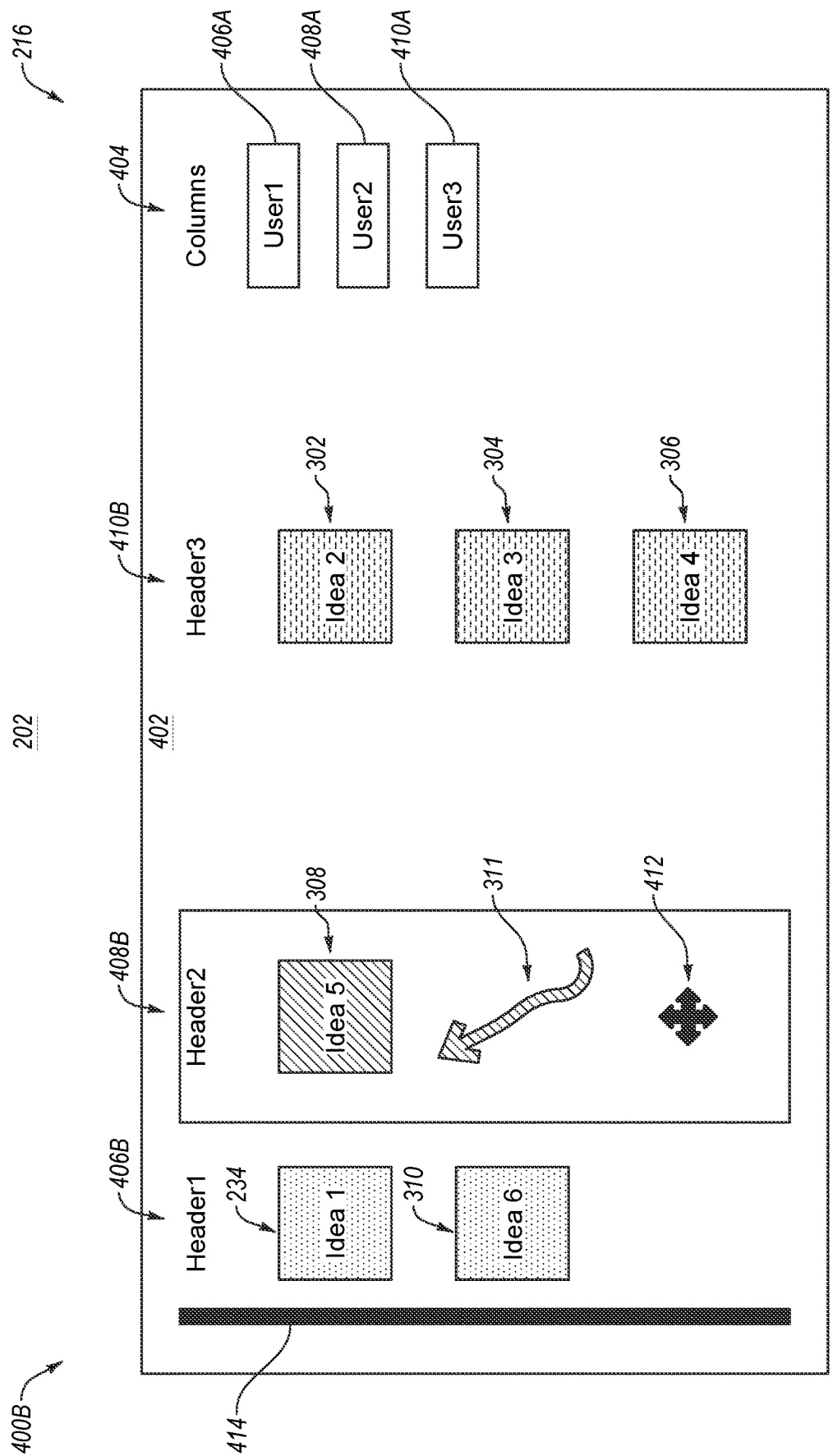
FIG. 4B includes a graphical representation of the data-backed container of FIG. 4A during movement of a column of the data-backed container.

FIG. 4B includes a graphical representation 400B of the container 402 of FIG. 4A during movement of the column 408B, arranged in accordance with at least one embodiment described herein. In the example of FIG. 4B, the column 408B has been selected and is being dragged to the left. A next location at which the column 408B may be dropped in the direction of movement is to the left of the column 406B. As the column 408B is dragged to the left, the next location in the direction of movement may be highlighted, e.g., by a drop bar 414. The drop bar 414 may indicate a location in the container 402 where the column 408B will be moved if the column 408B is dropped while the drop bar 414 is displayed. Thus, in this example, dropping the column 408B while the drop bar 414 is displayed to the left of the column 406B may cause the columns 406A, 408B to switch places from those shown in FIG. 4A.

Figure 4C:
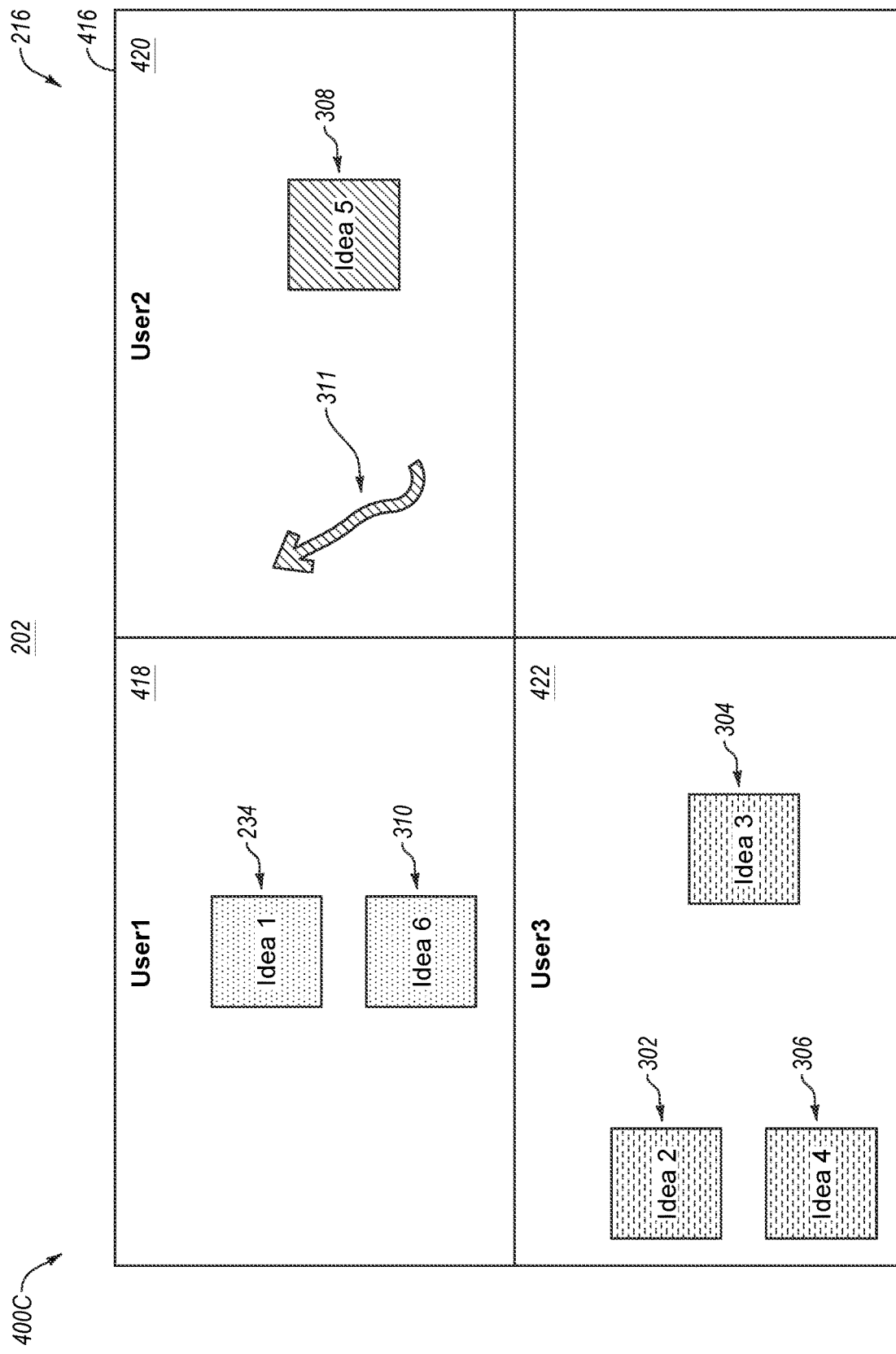
FIG. 4C includes a graphical representation of another example data-backed container that may be implemented in the UI of FIG. 2.

FIG. 4C includes a graphical representation 400C of another example data-backed container 416 (hereinafter "container 416") that may be implemented in the UI of FIG. 2, arranged in accordance with at least one embodiment described herein. Similar to the container 402 of FIGS. 4A and 4B, the container 416 is illustrated as part of the collaboration space 216 in the canvas 202 of FIG. 2. The menu bars 204, 206, 207, 209, 211 have been omitted from FIG. 4C for simplicity. The container 416 includes each of the sticky notes 234, 302, 304, 306, 308, 310 and the freehand graphical object 311 organized in a tabular arrangement.

With all of the sticky notes 234, 302, 304, 306, 308, 310 and the freehand graphical object 311 belonging to or otherwise associated with the container 416, the sticky notes 234, 302, 304, 306, 308, 310 and the freehand graphical object 311 may be automatically organized in tabs 418, 420, 422 responsive to user input. For example, a contextual formatting menu bar that is displayed in the collaboration space 216 when a data-backed container is selected may include a button or other menu option to organize graphical objects in the data-backed container in tabs based on an attribute of the graphical objects that may be selected from the menu. In this example, the attribute selected to organize the graphical objects within the container 416 in the tabs 418, 420, 422 is author.

In some embodiments, each of the tabs 418, 420, 422 may be named or labeled with a common value of the attribute of those graphical objects within the corresponding one of the tabs 418, 420, 422. For example, the tab 418 may be labeled "User1" as this is the value of the author attribute of each of the sticky notes 234, 310 in the tab 418. Similarly, the tab 420 may be labeled "User2" as this is the value of the author attribute of the sticky note 308 and the freehand graphical object 311 in the tab 420. Similarly, the tab 422 may be labeled "User3" as this is the value of the author attribute of each of the sticky notes 302, 304, 306 in the tab 422. Selection of a different attribute than author may automatically rearrange the sticky notes 234, 302, 304, 306, 308, 310 into corresponding tabs in the container 416.

Embodiments described herein may alternatively or additionally assist users in grouping or classifying sticky notes into different data-backed containers using sort and/or gather functionality. Various examples are discussed beginning with FIG. 5A.

Figure 5A:
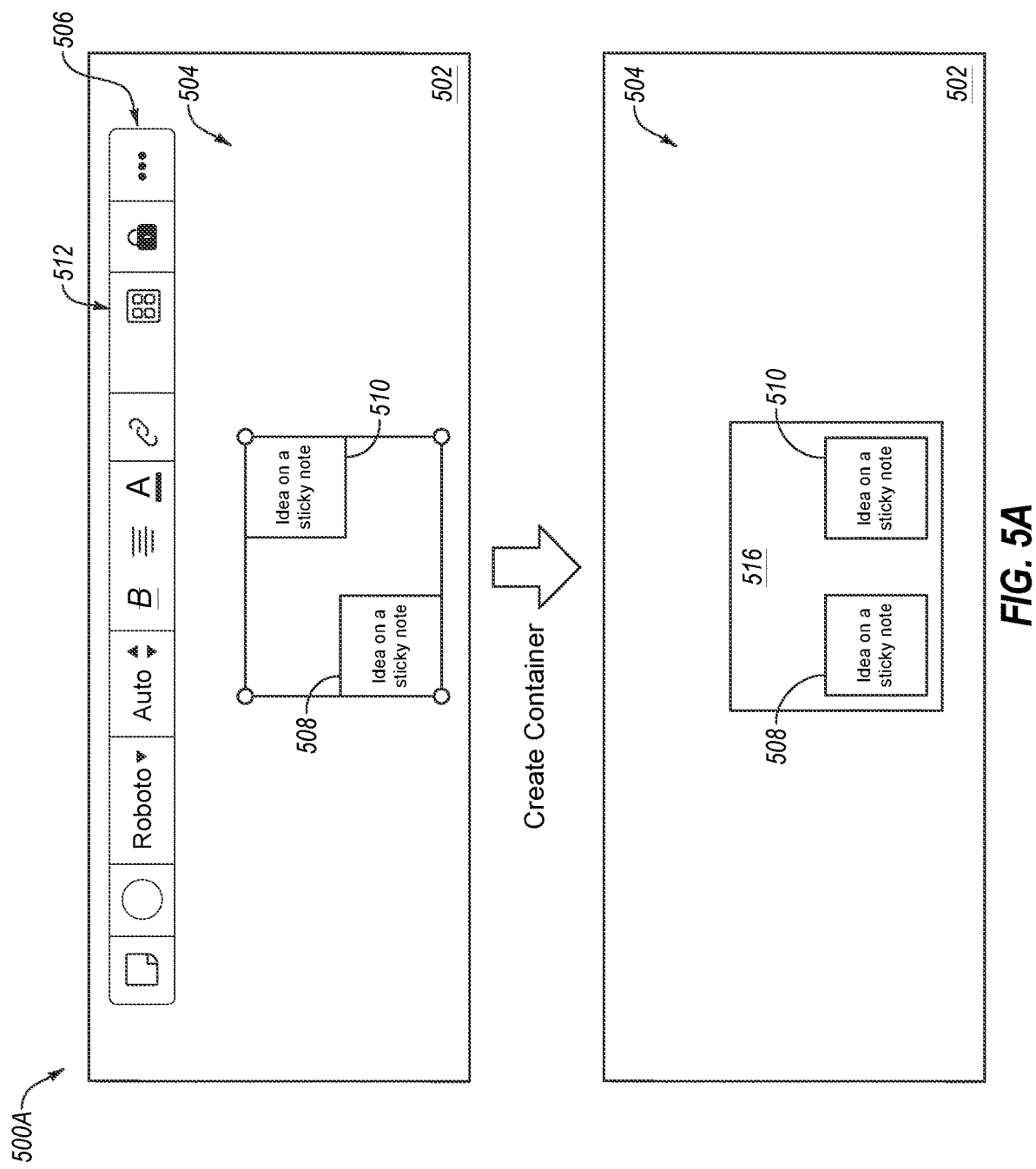
FIG. 5A includes a graphical representation of another example UI for online collaboration.

FIG. 5A includes a graphical representation 500A of another example UI for online collaboration, arranged in accordance with at least one embodiment described herein. The UI may be provided by the browser 128 and/or the collaboration application 114 of FIG. 1. For instance, the browser 128 in cooperation with the collaboration application 114 may present the UI of FIG. 5A to a user through a display of the client device 104. The UI of FIG. 5A may include, be included in, or correspond to the UI of FIGS. 2-4C.

In FIG. 5A, the graphical representation 500A includes a graphical drawing canvas 502 (hereinafter "canvas 502") in which a collaboration space 504 is displayed and a contextual formatting menu bar 506 that may include some or all of the same buttons as the contextual formatting menu bar 207 of FIG. 2. The graphical representation 500A additionally includes two sticky notes 508, 510.

In a manual grouping mode, a user may select multiple sticky notes or other graphical objects and provide input effective to designate the selected graphical objects as a group such that they are grouped together in a container. In the example of FIG. 5A, the sticky notes 508, 510 are both selected (e.g., by a ctrl+select operation of the two sticky notes 508, 510). The contextual formatting menu bar 506 may then be used to group the selected sticky notes 508, 510 together. In some embodiments, the contextual formatting menu bar 506 may be displayed in response to selection of multiple graphical objects and may otherwise be hidden.

As illustrated in FIG. 5A, the contextual formatting menu bar 506 includes a container and organize ideas button 512. The container and organize ideas button 512 may be the same as or similar to the container and organize ideas button 230 of FIG. 2. In some embodiments, when one or more graphical objects have been selected and the container and organize ideas button 512 is selected, the user may be presented with one or more of the following options in, e.g., a popup menu: create container, selection-specific sort, selection-specific gather, or selection-specific cluster.

The create container option may generate a new container that includes all of the selected graphical objects. For example, with both of the sticky notes 508, 510 selected, selection of the create container option may create a new data-backed container 516 with each of the selected sticky notes 508, 510 being associated with or belonging to the data-backed container 516.

The selection-specific sort option may perform a sort on the selected graphical objects but not on unselected graphical objects. In particular, the selected graphical objects may be sorted into containers based on a given attribute without sorting unselected graphical objects. In this example, all of the selected graphical objects that have a first value for the given attribute are sorted into a first container, all of the selected graphical objects that have a second value for the given attribute are sorted into a second container, and so on.

The selection-specific gather option may perform a gather on the selected graphical objects but not on unselected graphical objects. In particular, all of the selected graphical objects that have a specified value for a specified attribute may be gathered into a new container, while all of the selected graphical objects that have a different value for the specified attribute and all unselected graphical objects are not gathered into the new container or any other containers.

The selection-specific cluster may cluster the selected graphical objects based on themes/commonalities of text included in selected graphical objects.

Figure 5B:
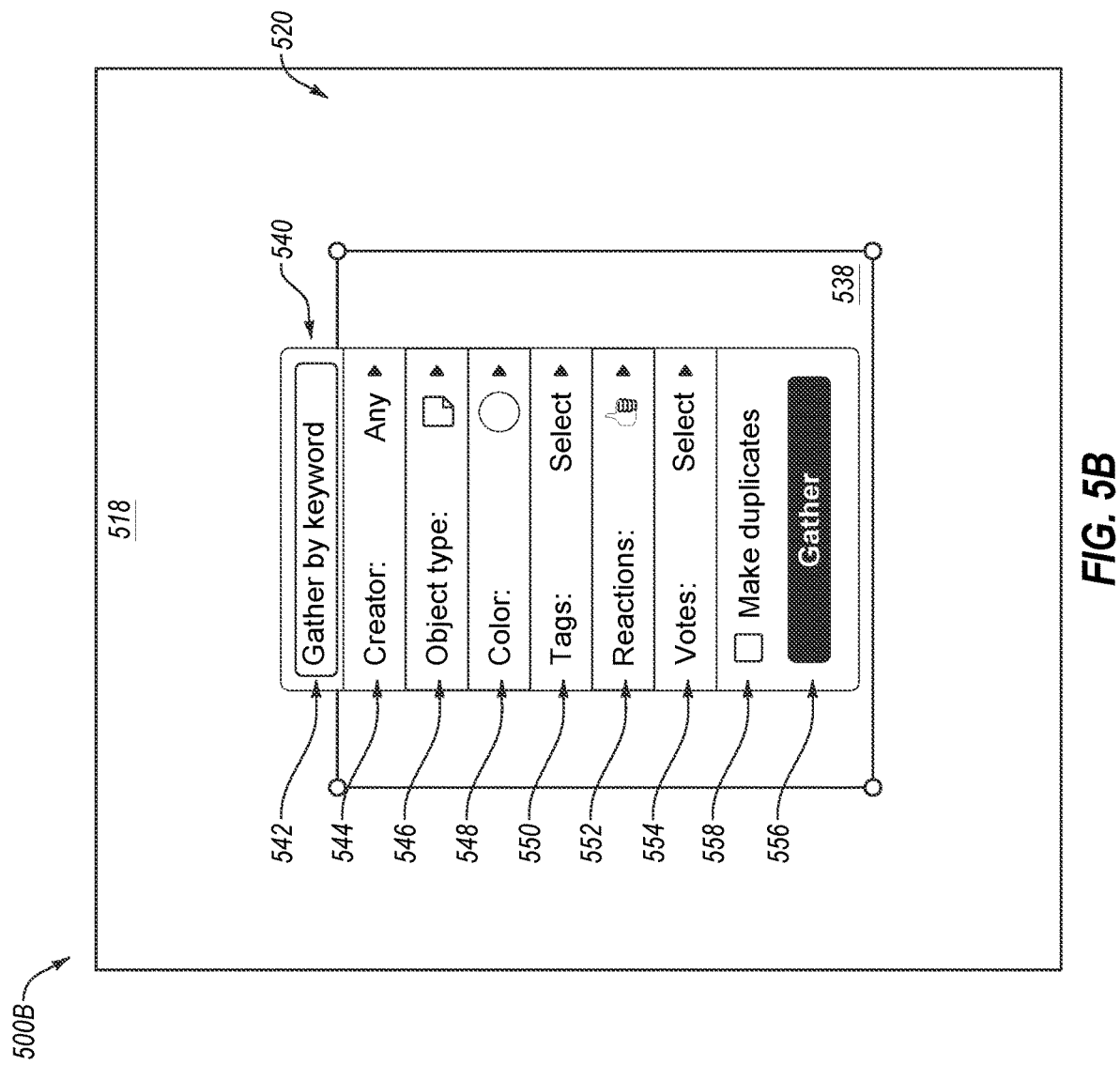
FIG. 5B includes a graphical representation of another example UI for online collaboration.

FIG. 5B includes a graphical representation 500B of another example UI for online collaboration, arranged in accordance with at least one embodiment described herein. The UI may be provided by the browser 128 and/or the collaboration application 114 of FIG. 1. For instance, the browser 128 in cooperation with the collaboration application 114 may present the UI of FIG. 5B to a user through a display of the client device 104. The UI of FIG. 5B may include, be included in, or correspond to the UI of FIGS. 2-4C or the UI of FIG. 5A.

In FIG. 5B, the graphical representation 500B includes a graphical drawing canvas 518 (hereinafter "canvas 518") in which a collaboration space 520 is displayed and a gather interface 540, e.g., a popup menu, that may be displayed in response to selection of a gather option (e.g., accessed via a container and organize ideas button such as 230) or selection of a selection-specific gather option (e.g., accessed via a container and organize ideas button such as 252 or 512). The collaboration space 520 may additionally include multiple sticky notes or other graphical objects that are not shown in FIG. 5B for simplicity.

In an assisted gather mode, a user may select the gather option or the selection-specific gather option or provide other suitable input to gather sticky notes or other graphical objects into a new container based on one or more attributes of the sticky notes. For example, in response to selection of the gather option, a new container 538 may be created in the collaboration space 520. The gather interface 540 may be displayed over the new container 538 in which the user may specify one or more attribute values of graphical objects to gather into the new container 538. Alternatively, the gather interface 540 or similar interface may be presented to the user prior to generating or displaying the new container 538 in the collaboration space 520 and the new container 538 may not be generated or displayed until the user indicates that the gather be performed, e.g., by selection of a button 556 or other input.

In the example of FIG. 5B, the gather interface 540 includes various attribute fields 542, 544, 546, 548, 550, 552, 554, some of which may include drop down menus from which a particular attribute value for the corresponding attribute may be selected. Additional or different attribute fields may be included in the gather interface 540 in other embodiments.

The attribute field 542 is a search field in which a user may input a keyword. When a keyword is input into the attribute field 542, any graphical objects that have the keyword, e.g., in their underlying information or in text on the graphical object, are candidates for inclusion in the new container 538, subject to satisfying any other conditions specified in the gather interface 540.

The attribute field 544 may be selected to specify an author value corresponding to any authors that have authored sticky notes or other content within the collaboration space 518. When the attribute field 544 is selected and a particular author value is specified, any graphical objects that were authored by the corresponding author are candidates for inclusion in the new container 538, subject to satisfying any other conditions specified in the gather interface 540.

The attribute field 546 may be selected to specify a graphical object type to include in the new container 538. Examples of object types include sticky note, shapes, textboxes, freehand shapes, etc. When the attribute field 546 is selected and a particular object type is specified, any graphical objects that are of the particular object type are candidates for inclusion in the new container 538, subject to satisfying any other conditions specified in the gather interface 540.

The attribute field 548 may be selected to specify a particular color value of graphical objects. When the attribute field 548 is selected and a particular color value is specified, any graphical objects that have the particular color value as their color are candidates for inclusion in the new container 538, subject to satisfying any other conditions specified in the gather interface 540.

The attribute field 550 may be selected to specify a particular tag value of graphical objects. Tags may be generated for graphical objects, e.g., as described in more detail elsewhere herein. When the attribute field 550 is selected and a particular tag value is specified, any graphical objects that have or include the particular tag value as or in their tag are candidates for inclusion in the new container 538, subject to satisfying any other conditions specified in the gather interface 540.

The attribute field 552 may be selected to specify a particular reaction value of graphical objects. When the attribute field 552 is selected and a particular reaction value is specified, any graphical objects that have the particular reaction value are candidates for inclusion in the new container 538, subject to satisfying any other conditions specified in the gather interface 540.

Although not illustrated in FIG. 5B, the gather interface may include an attribute field to select and specify a particular reactor value. When selected and a particular reactor value is specified, any graphical objects that have the particular reactor value (e.g., that have a reaction by the specified reactor) are candidates for inclusion in the new container 538, subject to satisfying any other conditions specified in the gather interface 540.

The attribute field 554 may be selected to specify a particular vote value, vote threshold, or vote range of graphical objects. When the attribute field 554 is selected and a particular vote value, vote threshold, or vote range is specified, any graphical objects that have the particular vote value or satisfy the vote threshold or vote range are candidates for inclusion in the new container 538, subject to satisfying any other conditions specified in the gather interface 540.

A gather button 556 may be selected when the user is ready to gather into the new container 538 all graphical objects that satisfy the conditions specified by the user in the gather interface 540. In response to selection of the gather button 556, corresponding graphical objects may be gathered into the new container 538 and the gather interface 540 may disappear.

In some embodiments, the collaboration application 114 (FIG. 1) may gather into the new container 538 only those graphical objects that each individually satisfies each and every condition specified by the user through the gather interface 540. For example, if the user selects multiple ones of the attribute fields 542, 544, 546, 548, 550, 552, 554 and specifies corresponding attribute values, the collaboration application 114 may gather into the new container 538 only those graphical objects that individually has each of the specified attribute values.

In some embodiments, the collaboration application 114 (FIG. 1) may gather into the new container 538 those graphical objects that each individually satisfies at least one, but not necessarily all, of the conditions specified by the user through the gather interface 540. For example, if the user selects multiple ones of the attribute fields 542, 544, 546, 548, 550, 552, 554 and specifies corresponding attribute values, the collaboration application 114 may gather into the new container 538 those graphical objects that individually has at least one of the specified attribute values. Similarly, in other embodiments the collaboration application 114 (FIG. 1) may gather into the new container 538 those graphical objects that each individually satisfies any number, but not necessarily all, of the conditions specified by the user through the gather interface 540.

Some embodiments of assisted gathering and/or sorting duplicate graphical objects and gather the duplicates while leaving original graphical objects at their corresponding locations on the canvas 518. In the example of FIG. 5B, the gather interface 540 includes a checkbox 558 for this purpose. Selection of the checkbox 558 may cause the collaboration application 114 to leave graphical objects wherever they happen to be on the canvas 518 while generating duplicates of the graphical objects to gather into the new container 538. In some embodiments, the duplicates are, at least initially, copies of the original graphical objects but are independent thereof. As such, alterations may be made to any of the duplicates without affecting any of the originals, or alterations may be made to any of the originals without affecting any of the duplicates.

Alternatively or additionally, some embodiments of assisted gathering and/or sorting generate shadow copies of graphical objects and gather the shadow copies while leaving original graphical objects at their corresponding locations on the canvas 518. Shadow copies may be generated in response to selecting an appropriate option, such as checking an appropriate box, in the gather interface 540. For instance, instead of or in addition to the checkbox 558 to make duplicates, the gather interface 540 may have a checkbox to generate shadow copies. Selection of the checkbox to generate shadow copies may cause the collaboration application 114 to leave graphical objects wherever they happen to be on the canvas 518 while generating shadow copies of the graphical objects to gather into the new container 538. In some embodiments, each shadow copy shares or uses the same underlying structured data or attributes as the graphical object from which it was generated. For example, each shadow copy may include the same graphical object re-rendered at a different location. In these and other embodiments, an alteration made to an attribute of any of the shadow copies may automatically propagate to the corresponding original graphical object or an alteration made to an attribute of any of the original graphical objects may automatically propagate to the corresponding shadow copy.

Figure 5C:
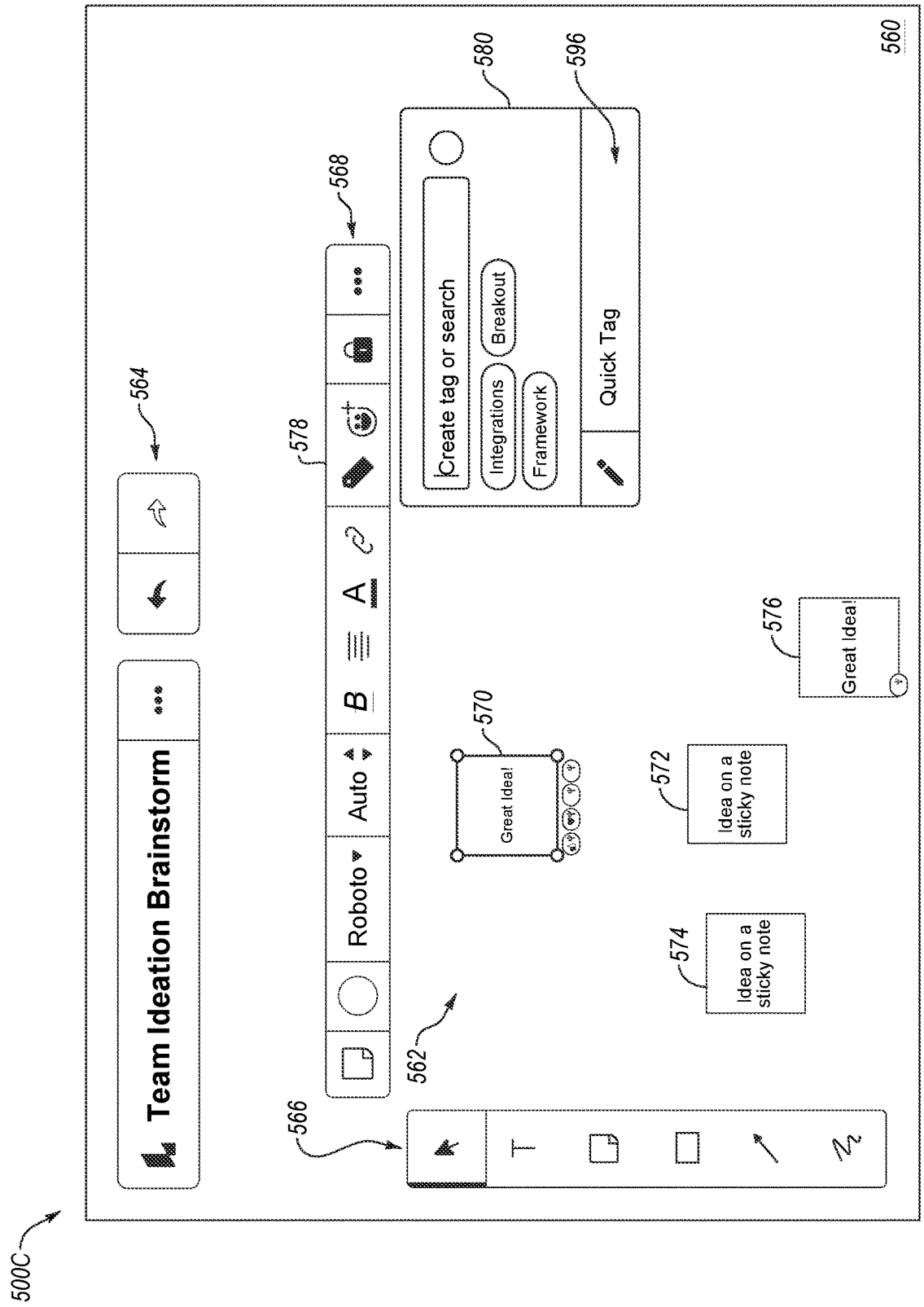
FIG. 5C includes a graphical representation of another example UI for online c, collaboration.

FIG. 5C includes a graphical representation 500C of another example UI for online collaboration, arranged in accordance with at least one embodiment described herein. The UI may be provided by the browser 128 and/or the collaboration application 114 of FIG. 1. For instance, the browser 128 in cooperation with the collaboration application 114 may present the UI of FIG. 5C to a user through a display of the client device 104. The UI of FIG. 5C may include, be included in, or correspond to other UIs described herein.

In FIG. 5C, the graphical representation 500B includes a graphical drawing canvas 560 (hereinafter "canvas 560") in which a collaboration space 562 is displayed and menu bars 564, 566, 568. The collaboration space 562 additionally includes multiple sticky notes 570, 572, 574, 576 or other graphical objects.

The menu bars 564, 566, 568 may be the same as or similar to the menu bars 204, 206, 207, respectively, of FIG. 2. The menu bar 568 includes a tagging button 578 that may be the same as or similar to the tagging button 246 of FIG. 2.

In some embodiments, when a tagging button is selected while a graphical object is highlighted, or selected, a tagging interface may be displayed in the graphical drawing canvas near or over the selected graphical object to allow a user to tag the selected graphical object. For example, as illustrated in FIG. 5C, after selection of the sticky note 570 and the tagging button 578, a tagging interface 580 is displayed in the canvas 560 near the selected sticky note 570.

The tagging interface 580 includes a field ("Create tag or search" in FIG. 5C) where the user may enter a new tag for the selected sticky note 570. The tagging interface 580 may additionally include pre-existing tags ("Integrations", "Breakout", and "Framework" in FIG. 5C) that have been used within the collaboration space 562 to tag other graphical objects. Accordingly, if the user desires to tag the selected sticky note 570 with a pre-existing tag, the user may select the desired pre-existing tag from the tagging interface 580. When a tag is added to a sticky note by the user (e.g., via the "Create tag or search" field or selection of a pre-existing tag), the tag may be saved by the collaboration application 114 in underlying data of the sticky note, e.g., in the structured source data 116. Alternatively or additionally, a tag icon or other icon may be displayed on or near the selected graphical object to indicate that the graphical object has been tagged. Tags may be used to sort or gather graphical objects.

Figure 5D:
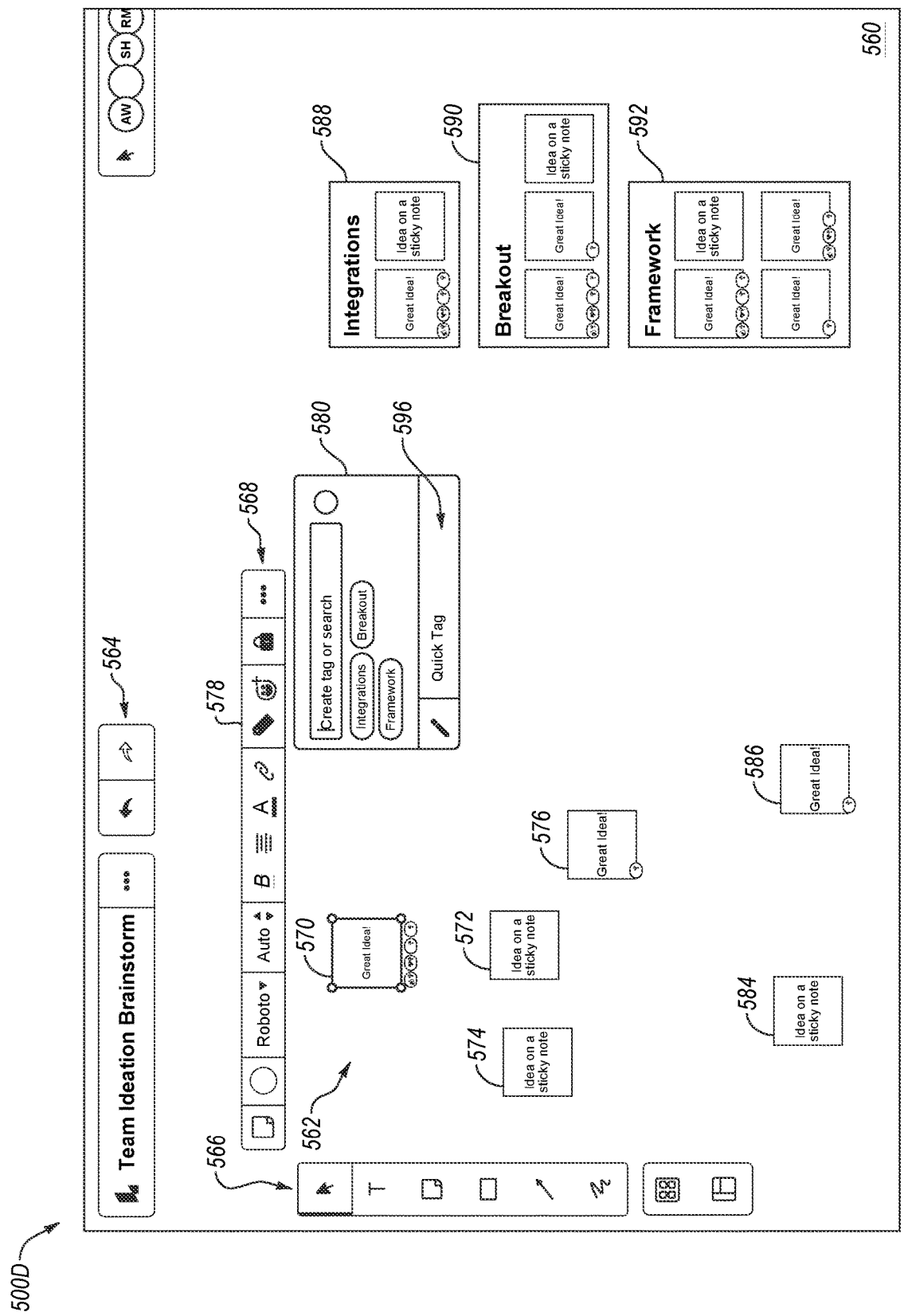
FIG. 5D includes a graphical representation of the UI of FIG. 5C with graphical objects sorted by tag.

FIG. 5D includes a graphical representation 500D of the UI of FIG. 5C with graphical objects sorted by tag, arranged in accordance with at least one embodiment described herein. The view of FIG. 5D is somewhat zoomed out compared to the view of FIG. 5C and additional sticky notes 584, 586 are visible on the canvas 560 that are not visible in FIG. 5C. The collaboration space 562 of FIGS. 5C and 5D may include additional sticky notes that are not visible in FIG. 5C or FIG. 5D.

As illustrated in FIG. 5D, with a duplicate or shadow copy feature turned on for a sort based on tags, duplicates or shadow copies of the sticky notes 570, 572, 574, 576, 584, 586 (plus three other sticky notes not visible elsewhere in the view of FIG. 5D) in the collaboration space 562 are sorted into containers 588, 590, 592. In particular, a duplicate or shadow copy of each graphical object tagged with the "Integrations" tag is sorted into the container 588, a duplicate or shadow copy of each graphical object tagged with the "Breakout" tag is sorted into the container 590, and a duplicate or shadow copy of each graphical object tagged with the "Framework" tag is sorted into the container 592. While duplicates or shadow copies of tagged graphical objects are sorted into containers and original graphical objects are left as is on the canvas in this example, in other examples the original graphical objects may be moved from their locations on the canvas and gathered into corresponding containers without creating or using duplicates or shadow copies.

Figure 5E:
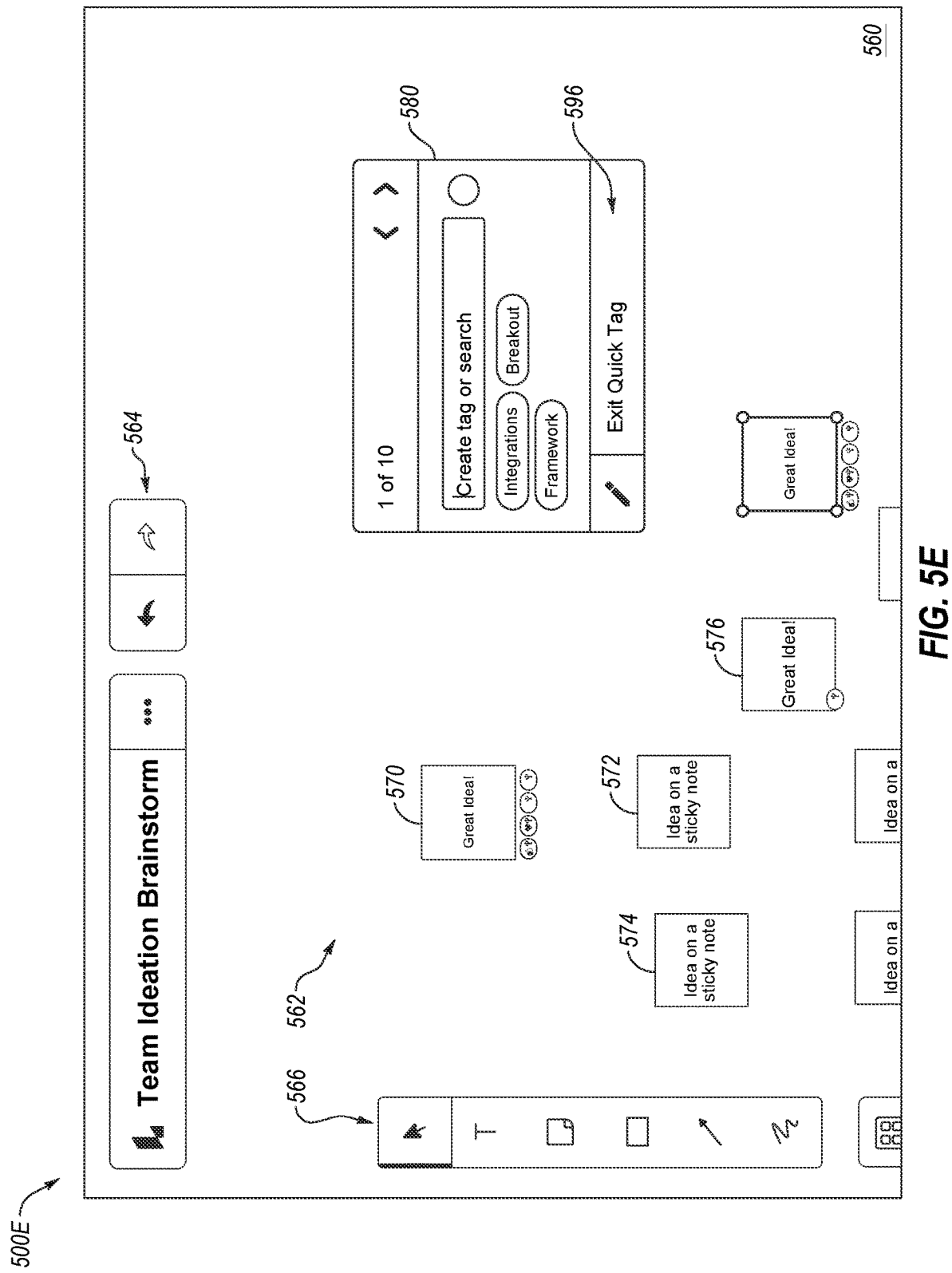
FIG. 5E includes another graphical representation of the UI of FIG. 5C.

FIG. 5E includes another graphical representation 500E of the UI of FIG. 5C, arranged in accordance with at least one embodiment described herein. As illustrated in FIG. 5C, the tagging interface 580 additionally includes a quick tag button 596. Selection of the quick tag button 596 may allow a user to enter multiple tags using, e.g., keyboard input only, for one or multiple graphical objects. For example, after selection of the quick tag button 596, a given graphical object (e.g., sticky notes 570, 572, 574, 576) may be selected and optionally highlighted as the user enters one or more tags, each tag completed when the user enters a hard return or provides other suitable feedback. The user may then advance to a next graphical object by entering a tab or other suitable input. The cycle may continue until the quick tagging process is stopped.

After the quick tag button 596 is selected, it may change to an exit quick tag button 598 as illustrated in FIG. 5E. Selection of the exit quick tag button 598 may terminate the quick tagging process.

Some of the embodiments described with respect to FIGS. 5A-5E, and particularly the embodiment of FIG. 5B, allow a user to gather graphical objects into a new container by selecting attributes and specifying corresponding values for graphical objects the user desires to gather into the new data-backed container. Alternatively or additionally, some embodiments may allow a user to select a single attribute to sort or cluster on. In this example, selection of a particular attribute (e.g., author, color, etc.) may cause the collaboration application 114 (FIG. 1) to, e.g., identify all unique values for the selected attribute, create a new container for each of the unique values, and sort the sticky notes or other graphical objects into the corresponding new container. For example, if a user selects color as the attribute to sort on, the collaboration application 114 may identify all unique values of the color attribute across graphical objects within a collaboration space. Suppose, for instance, that across twenty sticky notes in a collaboration space the color attribute of each of the sticky notes is one of only five values: red, green, blue, yellow, or orange. The collaboration application 114 may then create five new containers, one each for red, green, blue, yellow, and orange sticky notes. The collaboration application 114 may then sort all red sticky notes into the red container, all green sticky notes into the green container, and so on.

Alternatively or additionally, the collaboration application 114 may automatically group sticky notes or other graphical objects based on attributes. Such attributes may include author, shape, reaction, reactor, votes, tags, text keywords, intent, synthesized theme, or other attribute. In this and other embodiments, the collaboration application 114 or other system or device may apply machine learning, artificial intelligence, or other methodology to determine an intent, theme, or commonalities of each sticky note or other graphical object to permit automatic grouping based on intent, synthesized theme, or commonalities.

In some embodiments, sort operations, gather operations, or other operations described herein may be reversed or undone, e.g., by an undo operation that may be initiated by selection of the undo button 259 or other suitable button or menu option or selection of a corresponding revision from a list of revisions accessed by selection of the revision history button 263 or other suitable button or menu option. While the foregoing options permit sort or gather operations to be undone, the undo operation may require undoing all operations subsequent to the gather or sort to get back to the point where the gather or sort may be undone, while selection of an appropriate revision from a list of revisions may require knowledge of which revision to select from the list (which may not be obvious). Accordingly, some embodiments described herein may include an undo sort operation and/or an undo gather operation. Application of the undo sort or gather operation may undo the immediately preceding sort or gather operation without undoing any intervening operations and without having to select a corresponding revision from a revision history. In some embodiments, the undo sort operation may be initiated by selection of an undo sort button or option that may be accessible in a corresponding menu or menu bar. Alternatively or additionally, in some embodiments, the undo gather operation may be initiated by selection of an undo gather button or option that may be accessible in a corresponding menu or menu bar.

Figure 6A:
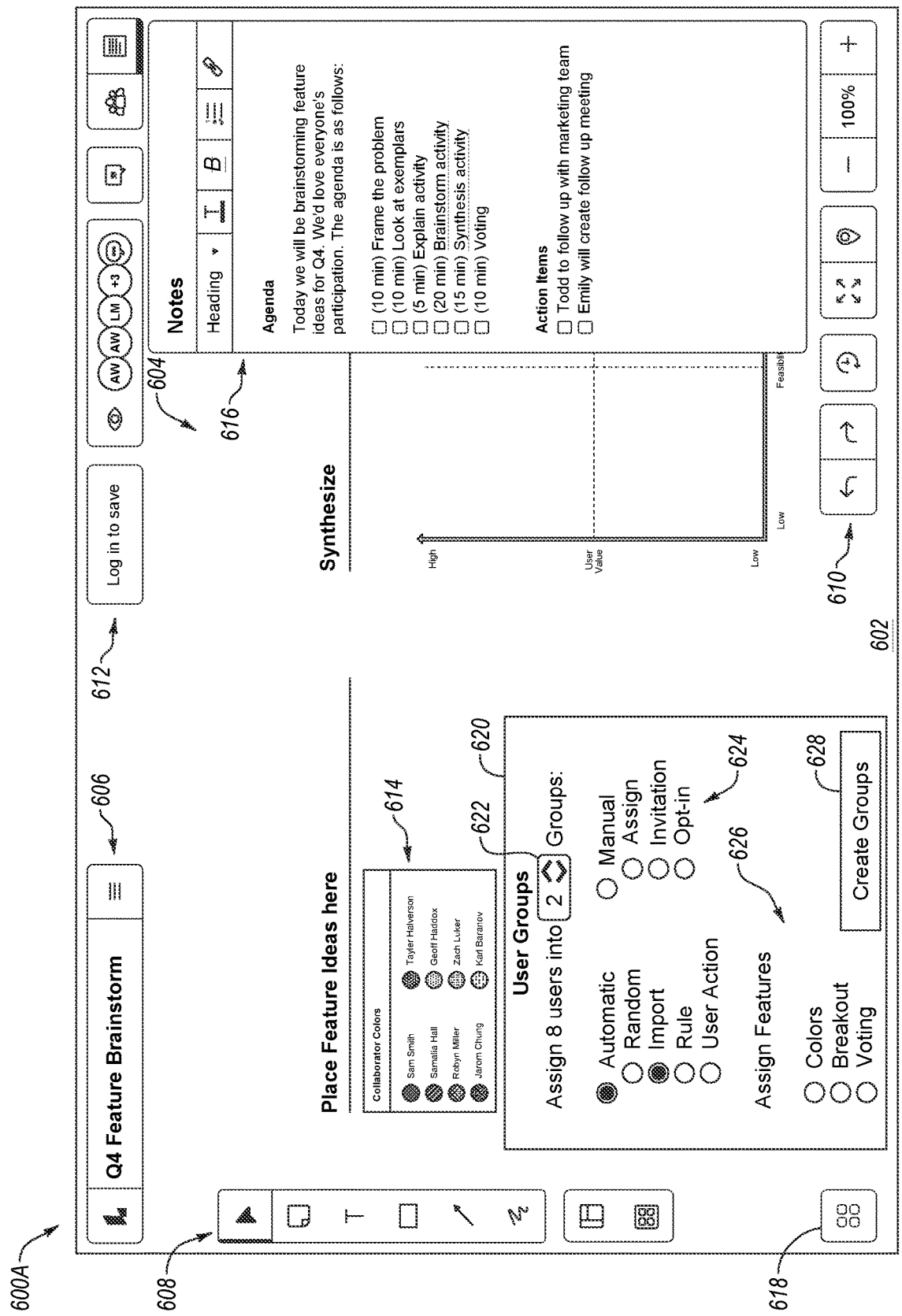
FIG. 6A includes a graphical representation of another example UI for online collaboration.

FIG. 6A includes a graphical representation 600A of another example UI for online collaboration, arranged in accordance with at least one embodiment described herein. The UI may be provided by the browser 128 and/or the collaboration application 114 of FIG. 1. For instance, the browser 128 in cooperation with the collaboration application 114 may present the UI of FIG. 6A to a user through a display of the client device 104. The UI of FIG. 6A may include, be included in, or correspond to any of the other UIs described herein.

In FIG. 6A, the graphical representation 600A includes a graphical drawing canvas 602 (hereinafter "canvas 602") in which a collaboration space 604 is displayed and various menu bars 606, 608, 610, 612. The menu bars 606, 608, 610, 612 may be the same as or similar to the menu bars 204, 206, 211, 209, respectively, of FIG. 2. The graphical representation 600A additionally includes a legend 614 that identifies a particular visual attribute (e.g., color, represented by different fill patterns in FIG. 6A) assigned to each of eight users, or collaborators, in the collaboration space 604. The graphical representation 600A additionally includes a notes bar 616 that may be opened in response to selection or activation of a notes button 616A from the menu bar 612. Notes in the notes bar 616 may be kept private or may be shared with other users in the collaboration space 604.

The graphical representation 600A may additionally include a button 618 that may be selected or otherwise activated to group users within the collaboration space 604 into subgroups. Different sets of one or more features may then be assigned to the users in each subgroup. Such features may include visual attributes, breakout rooms, voting, or other features.

For example, each subgroup may be assigned a different visual attribute or set of visual attributes to distinguish content and/or activity of users in one subgroup from that of users in another subgroup. In an example, all users within a subgroup may be assigned the same color, such as each user within one subgroup being assigned the color red, each user within another subgroup being assigned the color green, and so on. In another example, all users within a subgroup may be assigned a different color within a range of colors, such as each user within one subgroup being assigned a different shade of the color red, each user within another subgroup being assigned a different shade of the color green, and so on.

As another example, each subgroup may be assigned a different virtual breakout room within the collaboration space 604 where the users within a given subgroup work, at least for a predetermined duration of time, exclusively or primarily in the assigned virtual breakout room. In some embodiments, some or all of the content created in each of the virtual breakout rooms may be brought back to a virtual common room after the breakout rooms are closed or after some other event or action.

As another example, each subgroup may be assigned to different voting groups. In this example, each voting group may be assigned to vote on different sets of votable items. For example, users of a first subgroup may be assigned to vote on a first set of votable items while users in a second subgroup may be assigned to vote on a second set of votable items.

The button 618 may be included in the collaboration space 604 presented to every user in the collaboration space 604 or may only be presented to a facilitator or a subset of the users. Selection of the button 618 by the facilitator or user may open a user grouping interface 620, e.g., as a popup, where user groups may be defined and configured by the facilitator or user. The user grouping interface 620 may include an input field 622 where a number may be input as a number of subgroups into which the users in the collaboration space 604, in this case "8 users", are to be divided.

The user grouping interface 620 may additionally include a subgrouping area 624 to select or configure a subgrouping basis and a feature area 626 to select or configure assigned features for the subgroups. Each of the subgrouping area 624 and the feature area 626 may include selectable user interface elements, input fields, radio buttons, drop-down menus, or other suitable elements to configure the subgrouping basis and the assigned features.

For instance, the subgrouping area 624 may allow the facilitator or user to select an automatic or manual subgrouping basis. When the manual subgrouping basis is selected in the subgrouping area 624, the facilitator or user may select assignment, invitation, or opt-in. When the assignment manual subgrouping basis is selected, the facilitator or user may provide suitable input to manually assign each of the users in the collaboration space 604 to one of the subgroups.

When the invitation manual subgrouping basis is selected, an initial user in each of the subgroups may extend invitations to other users to join the subgroup. The initial user may be assigned by the facilitator or user or may be selected or defined in some other way.

When the opt-in manual subgrouping basis is selected, the existence of the subgroups may be published or otherwise made known to the users. The users may then opt-in or otherwise join any of the subgroups they choose.

When the automatic subgrouping basis is selected in the subgrouping area 624, e.g., as shown in FIG. 6A, the facilitator or user may then select a desired automatic subgrouping basis such as random, import, rule, or user action.

When the random automatic subgrouping basis is selected, the users in the collaboration space 604 may be randomly assigned to the subgroups. For example, one or more of the users may be assigned to the first subgroup and the remaining users may be assigned to the second subgroup. Alternatively or additionally, the random assignments may be subject to one or more constraints, such as the subgroups must have an equal number of users or none of the subgroups can have more than one additional user compared to any other subgroup.

When the import subgroups automatic subgrouping basis is selected, the users in the collaboration space 604 may be assigned to subgroups according to pre-existing subgroup assignments in a different application, such as in a video conference application. In this example, the collaboration application 114 may cooperate with the other application and the users may have already been assigned to subgroups in the other application, such as when users are assigned to breakout rooms in ZOOM. When the import subgroups automatic subgrouping basis is selected, an application programming interface (API) between the collaboration application 114 and the other application may assign the users in the collaboration space 604 to the same subgroups as in the other application.

When the rule automatic subgrouping basis is selected, a selectable or configurable rule may be applied to metadata of the users to assign the users to the subgroups based on the metadata of the users. For example, users employed by a business entity may belong to various departments within the business entity (e.g., accounting, human resources (HR), sales, etc.) and the departments to which the users belong may be included in metadata about the users that is accessible to the collaboration application 114. Further, the rule may be applied to the metadata to divide the users into subgroups based on their metadata, e.g., according to their respective departments in this example. That is, all users in the collaboration space 604 that are in a first department may be assigned to a first subgroup, all users in the collaboration space 604 that are in a second department may be assigned to a second subgroup, and so on.

When the user action automatic subgrouping basis is selected, a selectable or configurable user action may be applied to activity of the users in the collaboration space 604 to divide the users into subgroups according to the actions taken in the collaboration space 604. For example, users may respond to a poll or vote and all users that responded to the poll or voted the same way may be assigned to the same subgroup. As another example, users may create various types of graphical objects and all users that created a first type of graphical object may be assigned to a first subgroup, all users that created a second type of graphical object may be assigned to a second subgroup, and so on.

The feature area 626 may allow the facilitator or user to select different sets of one or more features to assign to each of the subgroups. By way of example, the feature area may 626 include colors (or other visual attributes), breakout rooms, or voting that may be assigned to the subgroups.

When the color feature is selected in the feature area 626, different colors or color ranges may be assigned to different subgroups. More generally, when a visual attribute feature is selected in the feature area 626, different visual attributes or visual attribute ranges may be assigned to different subgroups. In an example, the color red may be assigned to all users in a first subgroup, the color green may be assigned to all users in a second group, and so on. As another example, different shades of the color red may be assigned to the users in the first subgroup, different shades of the color green may be assigned to the users in the second subgroup, and so on. The specific colors or color ranges may be automatically, randomly, manually, or otherwise assigned to the subgroups and/or to the users within the subgroups.

When the breakout feature is selected in the feature area 626, different breakout rooms may be assigned to different subgroups. Optionally, the facilitator or user may select or define a duration of time for the existence of the breakout rooms and each subgroup may be confined to its breakout room for the duration. Alternatively, each subgroup may be moved to its breakout room when the breakout rooms are first created but the subgroups or one or more users thereof may be free to visit other breakout rooms.

When the voting feature is selected in the feature area 626, different sets of one or more votable items may be assigned to different subgroups. There may be partial or complete overlap between sets of votable items or there may be no overlap between sets of votable items. Optionally, the facilitator or user may select or define the sets of votable items and/or the sets that are assigned to each of the subgroups.

After providing suitable and sufficient input through the user grouping interface 620 or other interface, a button such as button 628 in the user grouping interface 620 may be selected to create the subgroups and assign different sets of one or more features to each of the subgroups.

Figure 6B:
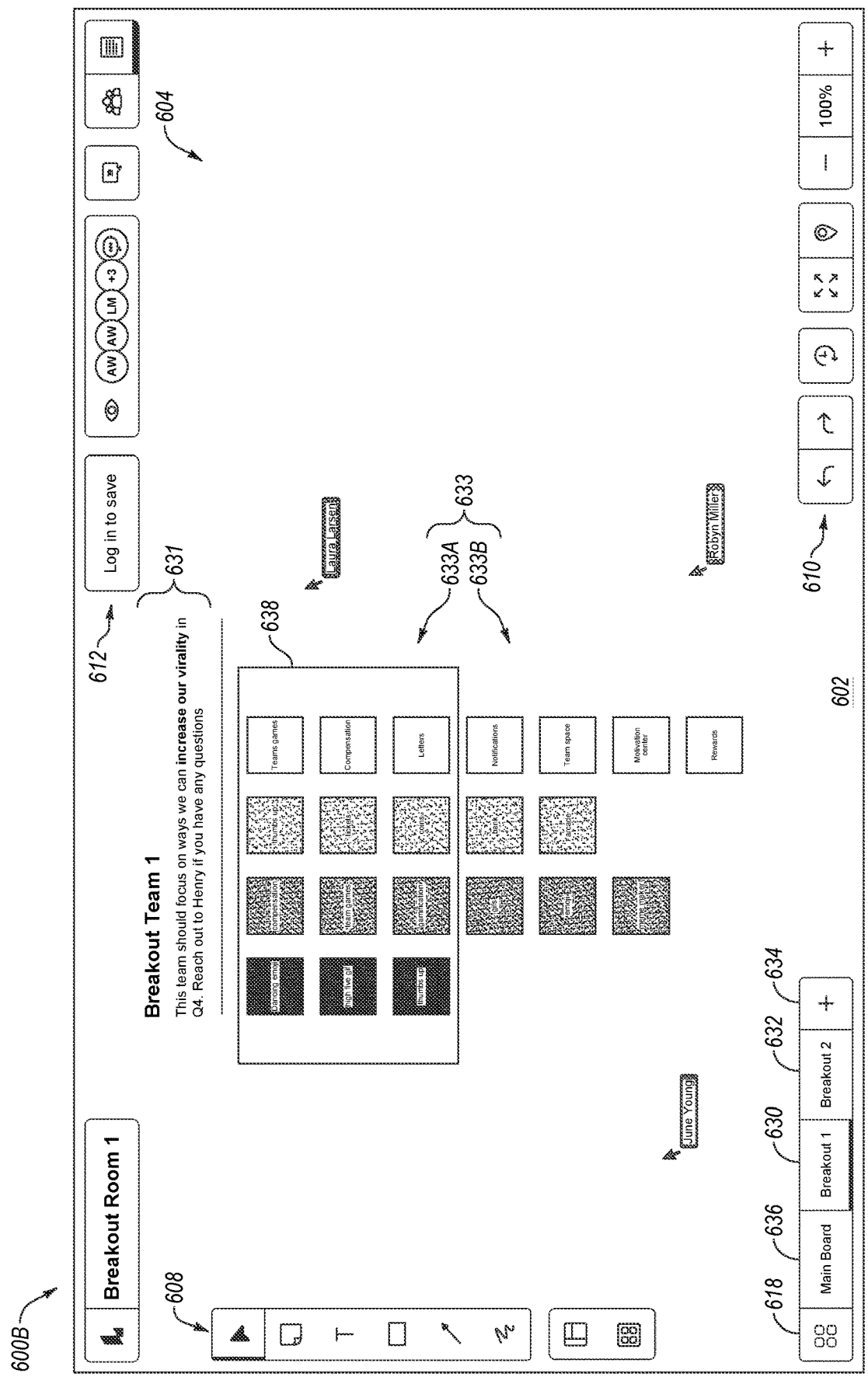
FIG. 6B includes a graphical representation of the UI of FIG. 6A in a virtual breakout room.

FIG. 6B includes a graphical representation 600B of the UI of FIG. 6A in a virtual breakout room such as may be created, e.g., through the user grouping interface 620 of FIG. 6A, arranged in accordance with at least one embodiment described herein. In this example, two virtual breakout rooms are created, one each for two subgroups. The two virtual breakout rooms are referred to as "Breakout 1" and "Breakout 2" while the two subgroups are referred to as "Breakout Team 1" and "Breakout Team 2". FIG. 6B depicts Breakout 1.

Optionally, each of the virtual breakout rooms may include a title, instructions, an intended purpose, or other information for the corresponding subgroup. For example, Breakout 1 includes a title and intended purpose 631 for Breakout Team 1. The title, instructions, intended purpose, and/or other information may be defined and/or provided by the facilitator or user, for instance.

Within each virtual breakout room, users in the corresponding subgroup may create content, such as sticky notes 633 or other graphical objects or content.

In some embodiments, all of the virtual breakout rooms may be accessible to all users, or to only a subset of users or to the facilitator. Each of the virtual breakout rooms may be accessed by selecting a corresponding one of tabs 630, 632 in the UI. For instance, Breakout 1 may be accessed by selecting tab 630, while Breakout 2 may be accessed by selecting tab 632.

Optionally, a new virtual breakout room button 634 may be selected to create a new virtual breakout room in the collaboration space 604.

Providing virtual breakout rooms or other virtual rooms on different pages or tabs within the collaboration space 604 may obscure other virtual rooms as such a configuration may permit users to be in and view a single virtual room at a time.

In other embodiments, virtual rooms may be provided in different areas on a single page of the collaboration space 604. In such embodiments, other virtual rooms may be obscured from users in a given virtual room. The other virtual rooms may be obscured by graying or blacking out the other virtual rooms or in some other manner.

Obscuring of other virtual rooms may be initiated in response to corresponding input from the facilitator or user. Subsequently, the facilitator or user may provide input effective to terminate the obscuring. When the obscuring is terminated, the gray-out or black-out applied to the other virtual rooms may be removed for each of the users.

Alternatively or additionally, a virtual common room may be created when virtual breakout rooms are created. In FIG. 6B, such a virtual common room may be accessed by selecting a corresponding tab, such as a tab 636 labeled "Main Board" in the UI of FIG. 6B. In some implementations, content created in each of the virtual breakout rooms may be brought to the virtual common room, e.g., in response to suitable input from the facilitator or user that created the virtual breakout rooms or from other user or in response to expiration of a timer or other input or event. Such content may include votes, graphical objects, reactions, tags, or other content.

The content brought to the virtual common room may include all or a subset of the content in one or more of the virtual breakout rooms.

The content brought to the virtual common room may include some of the content in one or more of the virtual breakout rooms. For example, the facilitator, user, or one of the users within each virtual breakout room may select one or more graphical objects or other content within the virtual breakout room and provide input effective to bring it to the virtual common room.

Alternatively or additionally, each virtual breakout room may have a designated or predefined area, such as predefined area 638 in FIG. 6B, and all content within the predefined area may be brought to the virtual common room. As an example, sticky notes 633A within the predefined area 638 may be brought to the virtual common room while sticky notes 633B outside the predefined area 638 may not be brought to the virtual common room. The pre-defined area 638 may include a container or an area of a different color than the canvas 602 to, e.g., designate that content in the pre-defined area 638 may be treated differently than content outside the pre-defined area 638.

As another example, content that has an attribute value that satisfies a condition may be brought to the virtual common while content that lacks the attribute value may not be brought to the virtual common room, or vice versa. For instance, all graphical objects in the virtual breakout rooms that include a fire emoji or other reaction, that have a specific number of votes, that have a number of votes in excess of or below a threshold, or that satisfy some other condition (or two or more conditions) may be brought to the virtual common room while other or remaining graphical objects that do not satisfy the condition (or conditions) are not brought to the virtual common room.

In some embodiments, functionality may be applied to the content brought to the virtual common room. For instance, sorting or gathering as described herein may be applied to the content brought to the virtual common room from the virtual breakout rooms.

Bringing content to the virtual common room from the virtual breakout rooms may include bringing a pdf of the content, data or metadata of the content, graphical objects of the content, and/or a copy of the content to the virtual common room from the virtual breakout rooms.

In some embodiments, content from the virtual breakout rooms may be sent to a specified or target location, e.g., in response to input from the facilitator or user effective to designate the target destination. The target destination may include the virtual common room, a different virtual breakout room, a clipboard, one or more mouse cursors of one or more users, or other target destination.

Views of some or all of the virtual breakout rooms may be presented to the facilitator or user that created the virtual breakout rooms or other user. For example, views of some or all of the virtual breakout rooms may be displayed simultaneously to the facilitator or other user. This may allow the facilitator to see the activity and/or progress of each subgroup of users in each of the virtual breakout rooms.

Alternatively or additionally, statistics may be compiled for each of the virtual breakout rooms and may be provided to the facilitator or other user. The statistics for each virtual breakout room may include a number of graphical objects in the virtual breakout room, a number of each type of graphical object in the virtual breakout room, demographics of users in the virtual breakout room, or other statistics.

In some embodiments, applicability of features initiated within each of the virtual breakout rooms may be limited to users within the corresponding virtual breakout room. For example, if a vote is called in a virtual breakout room, only those users within the virtual breakout room may be able to vote.

The user composition of each of the subgroups and/or assignments of subgroups to virtual breakout rooms or other features may be stored. For instance, the collaboration application 114 may store such information, e.g., in the corresponding collaboration space 112 such as the collaboration space 604 in this example. The stored information may be used to reference historical information and/or may be presented to the facilitator or other user so the facilitator or other user knows which users are in which subgroups/virtual breakout rooms in real time. If a user is disconnected from the collaboration space 604 and subsequently reconnects, the stored information may be analyzed to determine which subgroup/virtual breakout room to place the user in.

In some embodiments, the facilitator or other user may use the user grouping interface 620 (FIG. 6A) or other UI element(s) to add starting material to each of the virtual breakout rooms. For example, the facilitator or user may select or otherwise specify content from the virtual common room to duplicate into each of the virtual breakout rooms.

Alternatively or additionally, when each virtual breakout room is created, it may be populated with user-specific content from the virtual common room. For instance, all content authored by any user of a given subgroup in the virtual common room may be populated in the virtual breakout room of the subgroup. Populating the virtual breakout rooms with the user-specific content may include duplicating or moving user-specific content from the virtual common room to the corresponding virtual breakout room.

In some embodiments, content in one of the virtual breakout rooms may be shared with another virtual breakout room.

Figure 6C:
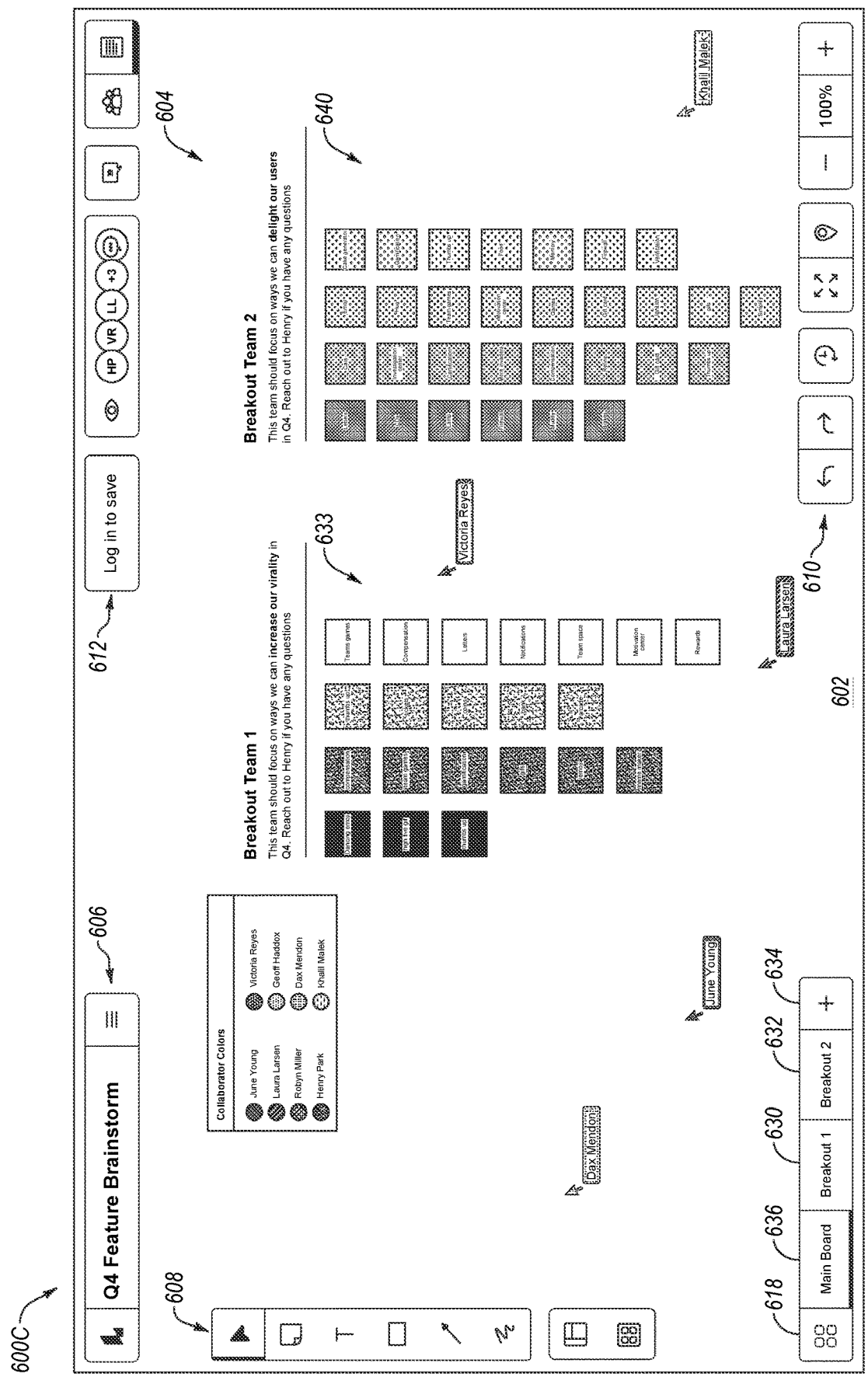
FIG. 6C includes a graphical representation of the UI of FIGS. 6A-6B in a virtual common room.

FIG. 6C includes a graphical representation 600C of the UI of FIGS. 6A-6B in the virtual common room, arranged in accordance with at least one embodiment described herein. FIG. 6C shows the virtual common room after content from both of the virtual breakout rooms Breakout 1 and Breakout 2 has been brought to the virtual common room. In particular, the virtual common room of FIG. 6C includes the sticky notes 633 from Breakout 1 as well as sticky notes 640 from Breakout 2. In this example, all the sticky notes 633 from Breakout 1 have been brought to the virtual common room of FIG. 6C (as opposed to just the sticky notes 633A in the predefined area 638 of FIG. 6B).

Figure 6D:
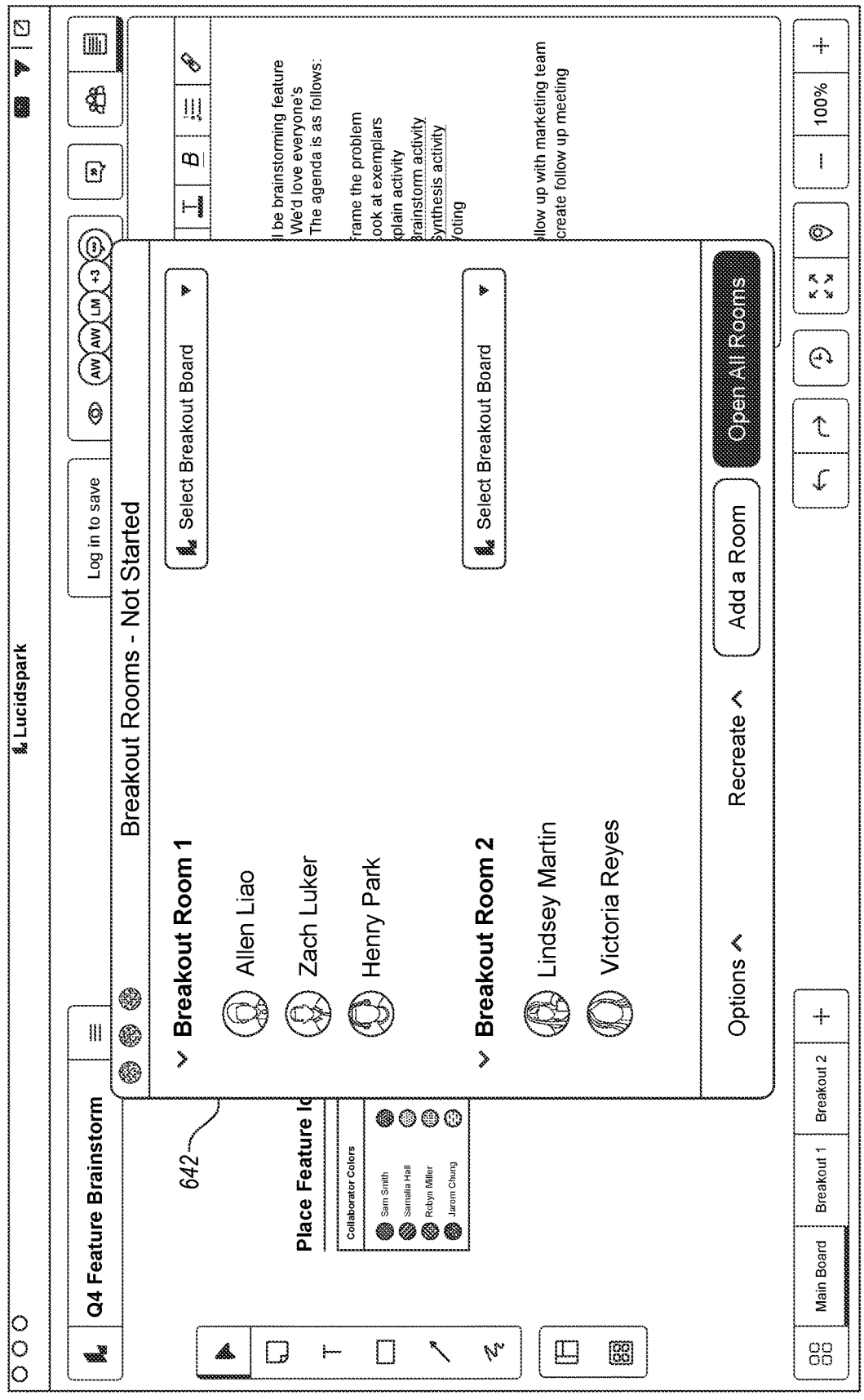
FIG. 6D includes a graphical representation 600D of another example UI for online collaboration.

FIG. 6D includes a graphical representation 600D of another example UI for online collaboration, arranged in accordance with at least one embodiment described herein. The UI may be provided by the browser 128 and/or the collaboration application 114 of FIG. 1. For instance, the browser 128 in cooperation with the collaboration application 114 may present the UI of FIG. 6A to a user through a display of the client device 104. The UI of FIG. 6D may include, be included in, or correspond to any of the other UIs described herein.

The UI of FIG. 6D is generally the same as or similar to the UI of FIG. 6A. The UI of FIG. 6D may include a breakout room interface 642 instead of or in addition to the user grouping interface 620 of FIG. 6A. The breakout room interface 642 may be navigated and/or operated by, e.g., the facilitator or other user to, e.g., create virtual breakout rooms, open the virtual breakout rooms, close the virtual breakout rooms, assign users to each virtual breakout room or corresponding subgroup, or otherwise configure or control the virtual breakout rooms.

After users have been divided into and worked as subgroups, it may be desirable to bring the users back into a single group and/or to eliminate the subgroups. In this and other embodiments, the facilitator or other user may provide input effective to bring the users back into a single group. Alternatively or additionally, the users may individually provide input effective to opt-in to the group, e.g., to leave the corresponding subgroup and rejoin the group.

As another example, input may be received from an API, e.g., at the collaboration application 114, indicating that virtual breakout rooms in a video conference application have closed or are closing. In this example, the users from all of the subgroups may rejoin the group responsive to the input from the API.

As yet another example, a rule may be applied to metadata of the users to determine which users are to rejoin the group.

As yet another example, users may rejoin the group based on something they did. For instance, users may rejoin the group responsive to performing a certain activity or activities.

Figure 7:
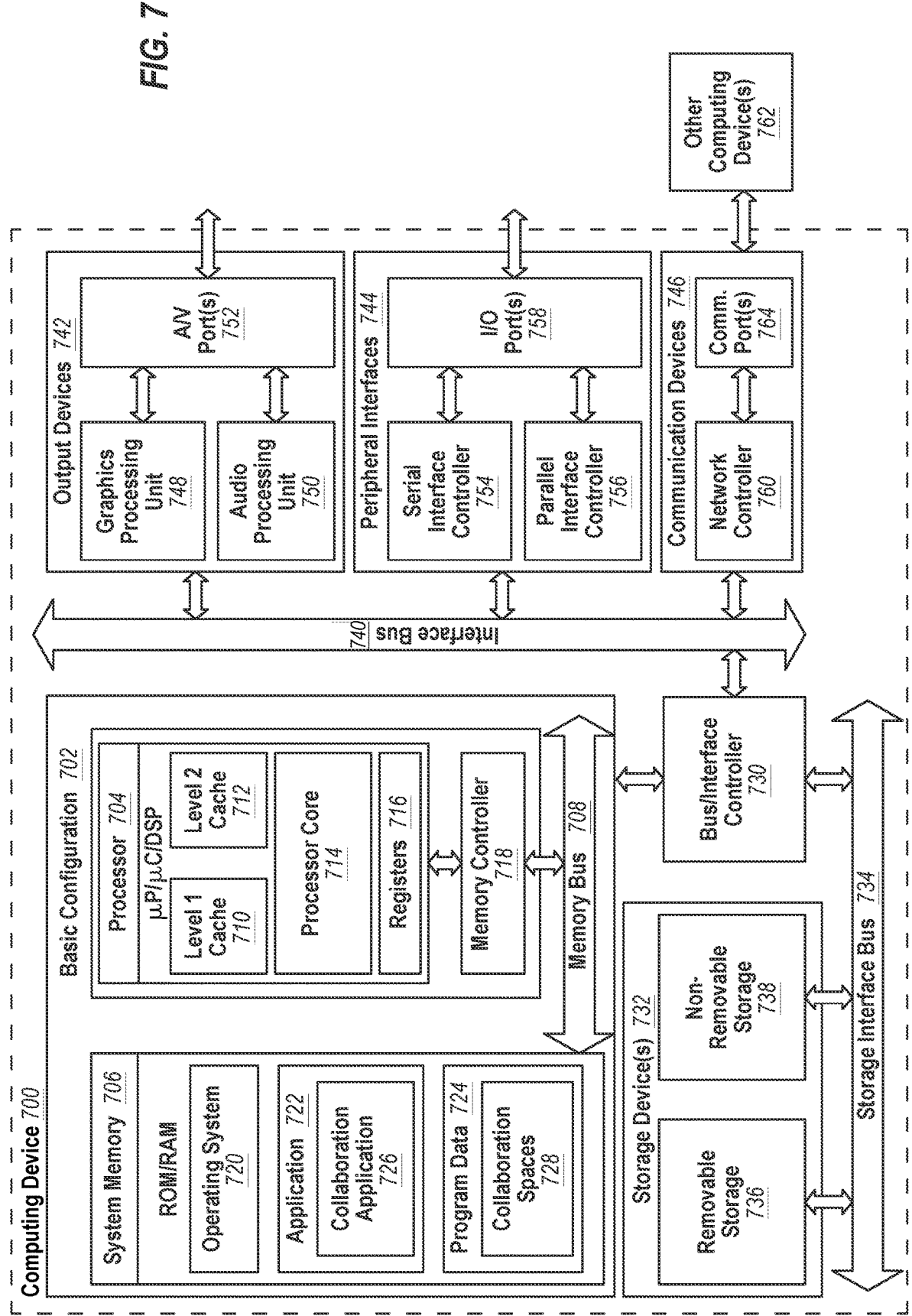
FIG. 7 is a block diagram illustrating an example computing device that is arranged to facilitate online collaboration, all arranged in accordance with at least one embodiment described herein.

FIG. 7 is a block diagram illustrating an example computing device 700 that is arranged to facilitate online collaboration, arranged in accordance with at least one embodiment described herein. The computing device 700 may include, be included in, or otherwise correspond to either or both of the server 102 or the client devices 104, 106, 108 of FIG. 1. In a basic configuration 702, the computing device 700 typically includes one or more processors 704 and a system memory 706. A memory bus 708 may be used to communicate between the processor 704 and the system memory 706.

Depending on the desired configuration, the processor 704 may be of any type including, but not limited to, a microprocessor (μP), a microcontroller (μC), a digital signal processor (DSP), or any combination thereof. The processor 704 may include one or more levels of caching, such as a level one cache 710 and a level two cache 712, a processor core 714, and registers 716. The processor core 714 may include an arithmetic logic unit (ALU), a floating point unit (FPU), a digital signal processing core (DSP Core), or any combination thereof. An example memory controller 718 may also be used with the processor 704, or in some implementations the memory controller 718 may include an internal part of the processor 704.

Depending on the desired configuration, the system memory 706 may be of any type including volatile memory (such as RAM), nonvolatile memory (such as ROM, flash memory, etc.), or any combination thereof. The system memory 706 may include an operating system 720, one or more applications 722, and program data 724. The application 722 may include a collaboration application 726 that is arranged to facilitate online collaboration. The collaboration application 726 may include, be included in, or otherwise correspond to the collaboration application 114 of FIG. 1. The program data 724 may include collaboration spaces 728 (which may include, be included in, or otherwise correspond to the collaboration spaces 112 of FIG. 1 or other collaboration spaces) as is described herein, structured source data collections (such as structured source data 116 of FIG. 1), models of structured source data (such as models 124 of FIG. 1) and/or other collaboration data. In some embodiments, the application 722 may be arranged to operate with the program data 724 on the operating system 720 such that one or more methods may be provided as described herein.

The computing device 700 may have additional features or functionality, and additional interfaces to facilitate communications between the basic configuration 702 and any involved devices and interfaces. For example, a bus/interface controller 730 may be used to facilitate communications between the basic configuration 702 and one or more data storage devices 732 via a storage interface bus 734. The data storage devices 732 may be removable storage devices 736, non-removable storage devices 738, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer-readable instructions, data structures, program modules, or other data.

The system memory 706, the removable storage devices 736, and the non-removable storage devices 738 are examples of computer storage media or non-transitory computer-readable media. Computer storage media or non-transitory computer-readable media includes RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other non-transitory medium which may be used to store the desired information and which may be accessed by the computing device 700. Any such computer storage media or non-transitory computer-readable media may be part of the computing device 700.

The computing device 700 may also include an interface bus 740 to facilitate communication from various interface devices (e.g., output devices 742, peripheral interfaces 744, and communication devices 746) to the basic configuration 702 via the bus/interface controller 730. The output devices 742 include a graphics processing unit 748 and an audio processing unit 750, which may be configured to communicate to various external devices such as a display or speakers via one or more A/V ports 752. Diagrams, flowcharts, organizational charts, connectors, and/or other graphical objects generated by the diagram application 726 may be output through the graphics processing unit 748 to such a display. The peripheral interfaces 744 include a serial interface controller 754 or a parallel interface controller 756, which may be configured to communicate with external devices such as input devices (e.g., keyboard, mouse, pen, voice input device, touch input device, etc.), sensors, or other peripheral devices (e.g., printer, scanner, etc.) via one or more I/O ports 758. Such input devices may be operated by a user to provide input to the diagram application 726, which input may be effective to, e.g., generate curved connectors, designate points as designated points of one or more curved connectors, relocate one or more designated points, and/or to accomplish other operations within the diagram application 726. The communication devices 746 include a network controller 760, which may be arranged to facilitate communications with one or more other computing devices 762 over a network communication link via one or more communication ports 764.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term "computer-readable media" as used herein may include both storage media and communication media.

The computing device 700 may be implemented as a portion of a small-form factor portable (or mobile) electronic device such as a smartphone, a personal data assistant (PDA) or an application-specific device. The computing device 700 may also be implemented as a personal computer including tablet computer, laptop computer, and/or non-laptop computer configurations, or a server computer including both rack-mounted server computer and blade server computer configurations.

Embodiments described herein may be implemented using computer-readable media for carrying or having computer-executable instructions or data structures stored thereon. Such computer-readable media may be any available media that may be accessed by a general-purpose or special-purpose computer. By way of example, such computer-readable media may include non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The subject technology of the present invention is illustrated, for example, according to various aspects described below. Various examples of aspects of the subject technology are described as lettered claims (A, B, C, etc.) for convenience. These are provided as examples and do not limit the subject technology. It is noted that any of the dependent lettered claims or portions thereof may be combined in any combination, and placed into an independent lettered claim, e.g., Claims A, E, J, etc. The other lettered claims can be presented in a similar manner. The following is a non-limiting summary of some examples presented herein.

A. A method to facilitate online collaboration, the method comprising:

granting access to a collaboration space to multiple client devices, each associated with a corresponding one of multiple users, the multiple users including a first user and a second user;

receiving input from the first user to create a first set of graphical objects in the collaboration space;

receiving input from the second user to create a second set of graphical objects in the collaboration space; and applying different visual attributes to graphical objects authored by different users to visually identify an author or creator of each graphical object such that all graphical objects of the first set of graphical objects have a first visual attribute and all graphical objects of the second set of graphical objects have a second visual attribute that is different than the first visual attribute.

B. The method of claim A, further comprising generating and displaying a legend in the collaboration space, the legend identifying the first visual attribute as a visual attribute of all graphical objects created by the first user and the second visual attribute as a visual attribute of all graphical objects created by the second user.

C. The method of claim A or B, further comprising applying the different visual attributes to mouse pointers of the different users to visually identify the user of each mouse pointer such that a mouse pointer of the first user has the first visual attribute and a mouse pointer of the second user has the second visual attribute.

D. A non-transitory computer-readable storage medium having computer-executable instructions stored thereon that are executable by a processor device to perform or control performance of the method of any one of claims A-C.

E. A method to organize graphical objects in a data-backed container, the method comprising:

receiving input effective to generate multiple graphical objects in a collaboration space;

receiving input effective to request that the graphical objects be organized in columns, rows, or tabs within a data-backed container based on an attribute of the graphical objects; and organizing the graphical objects in the columns, rows, or tabs of the data-backed container based on a value of the attribute of each of the graphical objects.

F. The method of claim E, wherein the attribute includes author, shape, color, reaction, reactor, vote, tag, or keyword.

G. The method of claim E or F, wherein organizing the graphical objects in the columns, rows, or tabs of the data-backed container comprises organizing the graphical objects in columns of the data-backed container, the method further comprising receiving input effective to drag and drop a first column from a first location in the data-backed container to a different second location in the data-backed container.

H. The method of any one of claims E-G, further comprising receiving input effective to request that the graphical objects be organized in columns, rows, or tabs within the data-backed container based on a different second attribute of the graphical objects; and organizing the graphical objects in the columns, rows, or tabs of the data-backed container based on a value of the different second attribute of each of the graphical objects such that the graphical objects have a different organization based on the value of the different second attribute compared to the organization based on the value of the attribute.

I. A non-transitory computer-readable storage medium having computer-executable instructions stored thereon that are executable by a processor device to perform or control performance of the method of any one of claims E-H.

J. A method to group graphical objects, the method comprising:

receiving input effective to simultaneously select multiple graphical objects in a collaboration space;

receiving input effective to group the selected graphical objects together; and generating a container that includes the selected graphical objects within the container.

K. A non-transitory computer-readable storage medium having computer-executable instructions stored thereon that are executable by a processor device to perform or control performance of the method of claim J.

L. A method to gather graphical objects, the method comprising:

receiving input effective to select an attribute and to specify an attribute value of graphical objects to gather into a container;

generating the container; and gathering graphical objects that include the attribute value for the attribute into the container.

M. The method of claim L, wherein gathering graphical objects that include the attribute value for the attribute into the container includes one of:

gathering, from a collaboration space, all graphical objects that include the attribute value for the attribute into the container;

gathering, from a selected set of graphical objects within the collaboration space, all graphical objects that include the attribute value for the attribute into the container; or gathering, from a predefined area or region within the collaboration space, all graphical objects that include the attribute value for the attribute into the container.

N. The method of claim L or M, further comprising receiving input effective to make duplicates of the graphical objects in the collaboration space before gathering graphical objects into the container, wherein gathering graphical objects that include the attribute value into the container comprises gathering the duplicates of the graphical objects in the collaboration space that include the attribute value for the attribute into the container.

O. The method of claim L or M, further comprising receiving input effective to make shadow copies of the graphical objects in the collaboration space before gathering graphical objects into the container, wherein gathering graphical objects that include the attribute value into the container comprises gathering the shadow copies of the graphical objects in the collaboration space that include the attribute value for the attribute into the container.

P. The method of claim L or M, further comprising receiving input effective to select a second attribute and to specify a second attribute value of graphical objects to include in the container, wherein gathering graphical objects that include the attribute value for the attribute into the container comprises gathering into the container graphical objects that include both the attribute value for the attribute and the second attribute value for the second attribute.

Q. The method of any one of claims L-P, wherein the attribute includes author, shape, color, reaction, reactor, vote, tag, or keyword.

R. The method of any one of claims L-Q, further comprising receiving input effective to select and tag one of the graphical objects with a tag.

S. The method of any one of claims L-R, further comprising receiving input effective to tag multiple graphical objects in the collaboration space in sequence via keyboard input only.

T. A non-transitory computer-readable storage medium having computer-executable instructions stored thereon that are executable by a processor device to perform or control performance of the method of any one of claims L-S.

U. A method to sort graphical objects, the method comprising:
receiving input effective to select an attribute to sort graphical objects on in a collaboration space;
identifying unique attribute values of the attribute across the graphical objects;
generating multiple containers to sort the graphical objects into, including one container for each of the unique attribute values; and
sorting the graphical objects into the containers, including sorting the graphical objects that include any given one of the unique attribute values for the attribute into the corresponding container.

V. The method of claim U, wherein sorting the graphical objects into the containers includes one of:
sorting, from a collaboration space, all graphical objects that have any of the unique attribute values for the attribute into the corresponding containers;
sorting, from a selected set of graphical objects within the collaboration space, all graphical objects that have any of the unique attribute values for the attribute into the corresponding containers; or
sorting, from a predefined area or region with the collaboration space, all graphical objects that have any of the unique attribute values for the attribute into the corresponding containers.

W. The method of claim U or V, further comprising receiving input effective to make duplicates of the graphical objects in the collaboration space before sorting the graphical objects into the containers, wherein sorting graphical objects into the containers comprises sorting the duplicates into the containers.

X. The method of claim U or V, further comprising receiving input effective to make shadow copies of the graphical objects in the collaboration space before sorting the graphical objects into the containers, wherein sorting graphical objects into the containers comprises sorting the shadow copies into the containers.

Y. The method of any one of claims U-X, wherein:
the unique attribute values of the attribute include a first attribute value and a second attribute value;
generating multiple containers includes generating a first container for the first attribute value and a second container for the second attribute value; and
sorting the graphical objects into the containers includes sorting graphical objects that have the first attribute value for the attribute into the first container and sorting graphical objects that have the second attribute value for the attribute into the second container.

Z. The method of any one of claims U-Y, wherein the attribute includes author, shape, color, reaction, reactor, vote, tag, or keyword.

AA. A non-transitory computer-readable storage medium having computer-executable instructions stored thereon that are executable by a processor device to perform or control performance of the method of any one of claims U-Z.

BB. A method to automatically group graphical objects in a collaboration space, the method comprising:
sensing an attribute of graphical objects in a collaboration space; and
automatically organizing the graphical objects into containers based on an attribute value of the attribute.

CC. The method of claim BB, wherein the graphical objects include text, the method further comprising applying machine learning or artificial intelligence to the text to determine an intent or theme of the text of each graphical object.

DD. The method of claim BB or CC, wherein the attribute includes author, shape, color, reaction, reactor, vote, tag, keyword, intent, or theme.

EE. A non-transitory computer-readable storage medium having computer-executable instructions stored thereon that are executable by a processor device to perform or control performance of the method of any one of claims AA-DD.

FF. A method to facilitate online collaboration, the method comprising:
granting access to an editable collaboration space to multiple users;
dividing the users into subgroups including at least a first subgroup and a second subgroup;
and assigning different sets of one or more features in the editable collaboration space to each of the subgroups, including:
assigning a first set of one or more features to the first subgroup; and
assigning a second set of one or more features to the second subgroup.

GG. The method of claim FF, wherein the users are divided into the subgroups in response to at least one of:
receiving from a facilitator or one of the users input that is effective to assign the users to the subgroups;
receiving from each of the users input that is effective to opt the user into a corresponding one of the subgroups;
receiving from the facilitator or one of the users input that is effective to randomly divide the users into the subgroups;
an application programming interface (API) assigning the users to the subgroups in an online collaboration application consistent with a pre-existing assignment of users to subgroups in a different application;
an initial user in each of the subgroups inviting other users to join the corresponding subgroup;
application of a rule to metadata of the users to assign the users to the subgroups based on the metadata of the users; or
each user taking one of a set of actions, each action of the set of actions corresponding to a different one of the subgroups such that each user that takes a first action is assigned to the first subgroup and each user that takes a second action is assigned to the second subgroup.

HH. The method of claim FF or GG, wherein assigning the different sets of one or more features to each of the subgroups includes at least one:
assigning different visual attributes to different subgroups such that graphical objects authored by users in the first subgroup share a first visual attribute and graphical objects authored by users in the second subgroup share a second visual attribute that is different than the first visual attribute;
assigning the subgroups to different virtual breakout rooms, including assigning users in the first subgroup to a first virtual breakout room and assigning users in the second subgroup to a second virtual breakout room that is different than the first virtual breakout room; or
assigning the subgroups to different voting groups, including assigning users in the first subgroup to vote on a first set of votable items and assigning users in the second subgroup to vote on a second set of votable items that is different than the first set of votable items.

II. The method of any one of claims FF-HH, further comprising:
receiving input from a first user of the users to change from the first subgroup to the second subgroup; and assigning the second set of one or more features to the first user.

JJ. The method of any one of claims FF-II, further comprising an application programming interface (API) pushing the subgroups from an online collaboration application to a different application.

KK. A non-transitory computer-readable storage medium having computer-executable instructions stored thereon that are executable by a processor device to perform or control performance of the method of any one of claims FF-JJ.

LL. A method to facilitate online collaboration, the method comprising:
 granting access to an editable collaboration space to multiple users;
 dividing the users into subgroups including at least a first subgroup and a second subgroup; and
 assigning the subgroups to different virtual breakout rooms in the editable collaboration space, including assigning users in the first subgroup to a first virtual breakout room and assigning users in the second subgroup to a second virtual breakout room that is different than the first virtual breakout room.

MM. The method of claim LL, wherein assigning the subgroups to different virtual breakout rooms comprises assigning each subgroup to a different tab in the editable collaboration space.

NN. The method of claim LL, wherein assigning the subgroups to different virtual breakout rooms comprises assigning each subgroup to a different area in the editable collaboration space.

OO. The method of claim LL, further comprising, for each user, obscuring all virtual breakout rooms in the editable collaboration space apart from the virtual breakout room to which the user is assigned.

PP. The method of claim OO, further comprising:
 at a first time prior to the obscuring, receiving from a facilitator or one of the users input that is effective to initiate, for each user, the obscuring;
 at a second time that is subsequent to the first time, receiving from the facilitator or one of the users input that is effective to terminate, for each user, the obscuring; and
 terminating the obscuring such that all virtual breakout rooms in the editable collaboration space are unobscured for all the users.

QQ. The method of any one of claims LL-PP, further comprising, responsive to input from one of the users, sharing content in the first virtual breakout room with one or more users in the second virtual breakout room.

RR. The method of any one of claims LL-QQ, further comprising populating each virtual breakout room with common initial content.

SS. The method of claim RR, further comprising receiving input from a facilitator or one of the users that is effective to select content from a virtual common room to duplicate into each of the virtual breakout rooms as the common initial content.

TT. The method of any one of claims LL-SS, further comprising populating each virtual breakout room with user-specific initial content from a virtual common room, including populating the first virtual breakout room with content authored by users of the first subgroup in the virtual common room and populating the second virtual breakout room with content authored by users of the second subgroup in the virtual common room.

UU. The method of any one of claims LL-TT, further comprising presenting views of each virtual breakout room to a facilitator.

VV. The method of any one of claims LL-UU, further comprising compiling statistics for each of the virtual breakout rooms.

WW. The method of claim VV, wherein the statistics for each of the virtual breakout rooms include at least one of: a number of graphical objects in the virtual breakout room, a number of each type of graphical object in the virtual breakout room, or demographics of users in the virtual breakout room.

XX. The method of any one of claims LL-WW, further comprising limiting applicability of a feature initiated within each of the virtual breakout rooms to users within the corresponding virtual breakout room.

YY. The method of any one of claims LL-XX, wherein the users are divided into the subgroups in response to an application programming interface (API) assigning the users to the subgroups in an online collaboration application consistent with a pre-existing assignment of users to subgroups in a video conference application.

ZZ. The method of any one of claims LL-YY, further comprising storing a user composition of each of the subgroups and the assignments of subgroups to the virtual breakout rooms.

AAA. The method of claim ZZ, further comprising, in response to one of the users disconnecting from an online collaboration application that facilitates the online collaboration and subsequently reconnecting to the online collaboration application, determining based on the stored user compositions and assignments a specific one of the subgroups and virtual breakout rooms to assign the user.

BBB. A non-transitory computer-readable storage medium having computer-executable instructions stored thereon that are executable by a processor device to perform or control performance of the method of any one of claims LL-AAA.

CCC. A method to facilitate online collaboration, the method comprising:
 granting access to an editable collaboration space to multiple users;
 dividing the users into subgroups including at least a first subgroup and a second subgroup;
 assigning the subgroups to different virtual breakout rooms in the editable collaboration space, including assigning users in the first subgroup to a first virtual breakout room and assigning users in the second subgroup to a second virtual breakout room that is different than the first virtual breakout room;
 receiving input from at least one user in each of the subgroups that is effective to add content to a corresponding virtual breakout room; and
 bringing content from each of the virtual breakout rooms to a virtual common room.

DDD. The method of claim CCC, wherein receiving input from the at least one user in each of the subgroups that is effective to add content to the corresponding virtual breakout room comprises receiving, from the at least one user in each of the subgroups, at least one of a vote, a reaction, a graphical object, or a tag.

EEE. The method of claim CCC or DDD, wherein bringing content from each of the virtual breakout rooms to the virtual common room comprises bringing all content from at least one of the virtual breakout rooms to the virtual common room.

FFF. The method of claim CCC or DDD, wherein bringing content from each of the virtual breakout rooms to the virtual common room comprises bringing at least a subset of all content from at least one of the virtual breakout rooms to the virtual common room.

GGG. The method of claim FFF, wherein bringing the at least the subset of all content from the at least one of the virtual breakout rooms to the virtual common room comprises at least one of:
  bringing all content of the at least one of the virtual breakout rooms that is selected by a user of the at least one of the virtual breakout rooms to the virtual common room;
  bringing all content of the at least one of the virtual breakout rooms that is located within a predefined area of the at least one of the virtual breakout rooms to the virtual common room; or
  bringing all content of the at least one of the virtual breakout rooms that has an attribute value that satisfies an attribute value condition to the virtual common room.

HHH. The method of any one of claims CCC-GGG, further comprising applying functionality to the content brought from each of the virtual breakout rooms to the virtual common room.

III. The method of claim HHH, wherein applying functionality to the content brought from each of the virtual breakout rooms to the virtual common room comprises at least one of:
  sorting at least some graphical objects included in the content into a plurality of containers in the virtual common room based on an attribute value of an attribute of each of the at least some graphical objects; or
  gathering at least some graphical objects included in the content into a container in the virtual common room based on an attribute value of an attribute of each of the at least some graphical objects.

JJJ. The method of any one of claims CCC-III, wherein bringing content from each of the virtual breakout rooms to the virtual common room comprises at least one of:
  bringing a pdf of the content from each of the virtual breakout rooms to the virtual common room;
  bringing data or metadata of the content from each of the virtual breakout rooms to the virtual common room;
  bringing graphical objects of the content from each of the virtual breakout rooms to the virtual common room; or
  bringing a copy of the content from each of the virtual breakout rooms to the virtual common room while leaving original content in each of the virtual breakout rooms.

KKK. The method of any one of claims CCC-JJJ, further comprising receiving input from a facilitator or a user of one of the virtual breakout rooms effective to designate a target destination of content created in the virtual breakout room, the target destination including at least one of the virtual common room, a different virtual breakout room, a clipboard, or one or more mouse cursors of one or more users.

LLL. A non-transitory computer-readable storage medium having computer-executable instructions stored thereon that are executable by a processor device to perform or control performance of the method of any one of claims CCC-KKK.

MMM. A method to facilitate online collaboration, the method comprising:
  granting access to an editable collaboration space to multiple users;
  dividing the users into subgroups including at least a first subgroup and a second subgroup;
  assigning different sets of one or more features in the editable collaboration space to each of the subgroups, including:
    assigning a first set of one or more features to the first subgroup; and
    assigning a second set of one or more features to the second subgroup; and
  rejoining at least some of the users from at least some of the subgroups.

NNN. The method of claim MMM, further comprising receiving input from a facilitator to rejoin all of the users, wherein rejoining at least some of the users from at least some of the subgroups comprises rejoining all of the users from all of the subgroups responsive to the input from the facilitator.

OOO. The method of claim MMM, further comprising receiving input from one of the users to rejoin all of the users, wherein rejoining at least some of the users from at least some of the subgroups comprises rejoining all of the users from all of the subgroups responsive to the input from the one of the users.

PPP. The method of claim MMM, further comprising receiving input from a user of the at least some of the users requesting that the user be rejoined, wherein rejoining at least some of the users from at least some of the subgroups comprises rejoining the user responsive to the input from the user.

QQQ. The method of claim MAIM, further comprising receiving input from an application programming interface (API) indicating that virtual breakout rooms in a video conference application have closed or are closing, wherein rejoining at least some of the users from at least some of the subgroups comprises rejoining all of the users from all of the subgroups responsive to the input from the API.

RRR. The method of claim MMM, further comprising determining the at least some of the users to rejoin based on metadata of the at least some of the users, wherein rejoining at least some of the users from at least some of the subgroups occurs in response to the determining.

SSS. The method of claim MMM, further comprising determining the at least some of the users to rejoin based on activity of the at least some of the users in the corresponding subgroup, wherein rejoining at least some of the users from at least some of the subgroups occurs in response to the determining.

TTT. A non-transitory computer-readable storage medium having computer-executable instructions stored thereon that are executable by a processor device to perform or control performance of the method of any one of claims MMM-SSS.

What is claimed is:

1. A method to facilitate online collaboration, the method comprising:
  granting access to an editable collaboration space to multiple users;
  dividing the users into subgroups including at least a first subgroup and a second subgroup;
  assigning the subgroups to different virtual breakout rooms in the editable collaboration space, including assigning users in the first subgroup to a first virtual breakout room and assigning users in the second subgroup to a second virtual breakout room that is different than the first virtual breakout room;
  populating the first virtual breakout room with user-specific initial content authored only by users of the first subgroup in a virtual common room; and
  populating the second virtual breakout room with user-specific initial content authored only by users of the second subgroup in the virtual common room.

2. The method of claim 1, wherein assigning the subgroups to different virtual breakout rooms comprises one of:
  assigning each subgroup to a different tab in the editable collaboration space; or
  assigning each subgroup to a different area in the editable collaboration space.

3. The method of claim 1, further comprising, for each user, confining the user to a corresponding virtual breakout room to which the user's subgroup is assigned.

4. The method of claim 1, further comprising, for each user, obscuring all virtual breakout rooms in the editable collaboration space apart from the virtual breakout room to which the user is assigned.

5. The method of claim 4, further comprising:
at a first time prior to the obscuring, receiving from a facilitator or one of the users input that is effective to initiate, for each user, the obscuring;
at a second time that is subsequent to the first time, receiving from the facilitator or one of the users, input that is effective to terminate, for each user, the obscuring; and
terminating the obscuring such that all virtual breakout rooms in the editable collaboration space are unobscured for all the users.

6. The method of claim 1, further comprising, responsive to input from one of the users, sharing content in the first virtual breakout room with one or more users in the second virtual breakout room.

7. The method of claim 1, further comprising populating each virtual breakout room with common initial content.

8. The method of claim 7, further comprising receiving input from a facilitator or one of the users that is effective to select content from the virtual common room to duplicate into each of the virtual breakout rooms as the common initial content.

9. The method of claim 1, further comprising assigning each subgroup to a different visual attribute to distinguish content or activity of a given subgroup within the editable collaboration space from content or activity of different subgroups within the editable collaboration space.

10. The method of claim 9, wherein assigning each subgroup to a different visual attribute comprises at least one of:
assigning each subgroup to a different color;
assigning each subgroup to a different fill pattern;
assigning each subgroup to a different transparency; or
assigning each subgroup to a different color and each user within a given subgroup to a different shade of a corresponding color.

11. The method of claim 1, further comprising compiling statistics for each of the virtual breakout rooms.

12. The method of claim 11, wherein the statistics for each of the virtual breakout rooms include at least one of: a number of graphical objects in the virtual breakout room, a number of each type of graphical object in the virtual breakout room, or demographics of users in the virtual breakout room.

13. The method of claim 1, further comprising limiting applicability of a feature initiated within each of the virtual breakout rooms to users within the corresponding virtual breakout room.

14. A method to facilitate online collaboration, the method comprising:
granting access to an editable collaboration space to multiple users;
dividing the users into subgroups including at least a first subgroup and a second subgroup; and
assigning the subgroups to different virtual breakout rooms in the editable collaboration space, including assigning users in the first subgroup to a first virtual breakout room and assigning users in the second subgroup to a second virtual breakout room that is different than the first virtual breakout room;
wherein the users are divided into the subgroups in response to an application programming interface (API) assigning the users to the subgroups in an online collaboration application consistent with a pre-existing assignment of users to subgroups in a video conference application.

15. The method of claim 1, further comprising removing the users from the subgroups to reform the users as a single group.

16. The method of claim 1, further comprising:
storing a user composition of each of the subgroups and the assignments of subgroups to the virtual breakout rooms; and
in response to one of the users disconnecting from an online collaboration application that facilitates online collaboration and subsequently reconnecting to the online collaboration application, determining based on the stored user compositions and assignments a specific one of the subgroups and virtual breakout rooms to assign the user.

17. A non-transitory computer-readable storage medium having computer-executable instructions stored thereon that are executable by a processor device to perform or control performance of the method of claim 1.

18. A method to facilitate online collaboration, the method comprising:
granting access to an editable collaboration space to multiple users;
dividing the users into subgroups including at least a first subgroup and a second subgroup;
assigning the subgroups to different virtual breakout rooms in the editable collaboration space, including assigning users in the first subgroup to a first virtual breakout room and assigning users in the second subgroup to a second virtual breakout room that is different than the first virtual breakout room;
receiving input from at least one user in each of the subgroups that is effective to add user-specific initial content from a virtual common room to a corresponding virtual breakout room; and
bringing content from each of the virtual breakout rooms to the virtual common room that has an attribute value that satisfies an attribute value condition to the virtual common room.

19. The method of claim 18, wherein receiving input from the at least one user in each of the subgroups that is effective to add the user-specific initial content from the virtual common room to the corresponding virtual breakout room comprises receiving, from the at least one user in each of the subgroups, at least one of a vote, a reaction, a graphical object, or a tag.

20. The method of claim 18, wherein bringing content from each of the virtual breakout rooms to the virtual common room comprises bringing all content from at least one of the virtual breakout rooms to the virtual common room.

21. The method of claim 18, wherein bringing content from each of the virtual breakout rooms to the virtual common room that has an attribute value that satisfies an attribute value condition to the virtual common room comprises bringing at least a subset of all content from at least one of the virtual breakout rooms to the virtual common room.

22. The method of claim 18, wherein bringing content from each of the virtual breakout rooms to the virtual common room that has an attribute value that satisfies an attribute value condition to the virtual common room comprises at least one of:
- bringing all content from each of the virtual breakout rooms that received a particular user reaction;
- bringing all content from each of the virtual breakout rooms that received a particular number of votes; or
- bringing all content from each of the virtual breakout rooms that received a number of votes equal to or greater than a threshold value.

23. The method of claim 18, further comprising applying functionality to the content brought from each of the virtual breakout rooms to the virtual common room.

24. The method of claim 23, wherein applying functionality to the content brought from each of the virtual breakout rooms to the virtual common room comprises at least one of:
- sorting at least some graphical objects included in the content into a plurality of containers in the virtual common room based on an attribute value of an attribute of each of the at least some graphical objects; or
- gathering at least some graphical objects included in the content into a container in the virtual common room based on an attribute value of an attribute of each of the at least some graphical objects.

25. The method of claim 18, wherein bringing content from each of the virtual breakout rooms to the virtual common room comprises at least one of:
- bringing a pdf of the content from each of the virtual breakout rooms to the virtual common room;
- bringing data or metadata of the content from each of the virtual breakout rooms to the virtual common room;
- bringing graphical objects of the content from each of the virtual breakout rooms to the virtual common room; or
- bringing a copy of the content from each of the virtual breakout rooms to the virtual common room while leaving original content in each of the virtual breakout rooms.

26. The method of claim 18, further comprising receiving input from a facilitator or a user of one of the virtual breakout rooms effective to designate a target destination of content created in the virtual breakout room, the target destination including at least one of the virtual common room, a different virtual breakout room, a clipboard, or one or more mouse cursors of one or more users.

\* \* \* \* \*